US012505534B2

(12) United States Patent
Albrecht et al.

(10) Patent No.: US 12,505,534 B2
(45) Date of Patent: Dec. 23, 2025

(54) MACHINE-LEARNING TECHNIQUES FOR PREDICTION OF FUTURE VISUAL ACUITY

(71) Applicant: Hoffmann-La Roche Inc., Little Falls, NJ (US)

(72) Inventors: Thomas Felix Albrecht, Basel (CH); Filippo Arcadu, Basel (CH); Fethallah Benmansour, Basel (CH); Yun Li, Basel (CH); Andreas Maunz, Basel (CH); Jayashree Sahni, Basel (CH); Andreas Thalhammer, Basel (CH); Yan-Ping Zhang Schaerer, Basel (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 677 days.

(21) Appl. No.: 17/725,765

(22) Filed: Apr. 21, 2022

(65) Prior Publication Data

US 2022/0319003 A1 Oct. 6, 2022

Related U.S. Application Data

(63) Continuation of application No. PCT/US2020/055233, filed on Oct. 12, 2020.

(30) Foreign Application Priority Data

Oct. 25, 2019 (EP) .................................. 19205315

(51) Int. Cl.
*G06T 7/00* (2017.01)
*A61B 3/00* (2006.01)
(Continued)

(52) U.S. Cl.
CPC .......... *G06T 7/0012* (2013.01); *A61B 3/0025* (2013.01); *A61B 3/102* (2013.01);
(Continued)

(58) Field of Classification Search
CPC ......... G06T 2207/30041; G06T 7/0012; G06T 2207/20084; G06T 2207/20081;
(Continued)

(56) References Cited

U.S. PATENT DOCUMENTS 9,775,506 B2 * 10/2017 Burlina .................... A61B 3/10
10,052,016 B2 * 8/2018 Ehlers .................. G06V 40/197
(Continued)

FOREIGN PATENT DOCUMENTS

JP 2022542473 A 10/2022

OTHER PUBLICATIONS

Ursula Schmidt-Erfurth, Hrvoje Bogunovic, Amir Sadeghipour, Thomas Schlegl, Georg Langs, Bianca S. Gerendas, Aaron Osborne, Sebastian M. Waldstein, Machine Learning to Analyze the Prognostic Value of Current Imaging Biomarkers in Neovascular Age-Related Macular Degeneration, Ophthalmology Retina, (Year: 2018).*

(Continued)

*Primary Examiner* — Courtney Joan Nelson
(74) *Attorney, Agent, or Firm* — Kilpatrick Townsend & Stockton LLP

(57) ABSTRACT

Methods and systems disclosed herein relate generally to systems and methods for predicting a future visual acuity of a subject by using machine-learning models. An image of at least part of a retina of a subject can be processed by one or more first machine-learning models to detect a set of retina-related segments. Segment-specific metrics that characterize a retina-related segment of the set of retina-related segments can be generated. The segment-specific metrics can be processed by using a second machine-learning model to generate a result corresponding to a prediction corresponding to a future visual acuity of the subject.

18 Claims, 8 Drawing Sheets

(51) Int. Cl.
*A61B 3/10* (2006.01)
*A61B 3/12* (2006.01)
*G06T 7/11* (2017.01)
*G06T 7/62* (2017.01)

(52) U.S. Cl.
CPC .............. *A61B 3/1225* (2013.01); *G06T 7/11* (2017.01); *G06T 7/62* (2017.01); *G06T 2207/10101* (2013.01); *G06T 2207/20081* (2013.01); *G06T 2207/20084* (2013.01); *G06T 2207/30041* (2013.01)

(58) Field of Classification Search
CPC ... G06T 2207/10101; G06T 7/11; G06T 7/62; G06T 7/10; G06T 7/0016; A61B 3/102; A61B 3/14; A61B 5/7267; A61B 3/1005; A61B 5/0066; A61B 5/0013; A61B 5/6821; A61B 3/0025; A61B 3/1225; G16H 50/20; G16H 10/60; G16H 50/30; G16H 30/20; G06N 20/00; G06N 3/0464; G06N 3/08; G06V 10/82
See application file for complete search history.

(56) References Cited

U.S. PATENT DOCUMENTS

| | | | |
|---|---|---|---|
| 2013/0286354 A1* | 10/2013 | Stetson | A61B 3/102 351/246 |
| 2018/0132725 A1 | 5/2018 | Vogl et al. | |
| 2018/0315193 A1* | 11/2018 | Paschalakis | A61B 3/12 |
| 2019/0110753 A1* | 4/2019 | Zhang | A61B 3/0025 |
| 2019/0180441 A1* | 6/2019 | Peng | G06T 7/0016 |
| 2020/0077883 A1* | 3/2020 | Ehlers | A61B 3/0025 |
| 2021/0026039 A1 | 1/2021 | Depodwin et al. | |

OTHER PUBLICATIONS

[Continued item U]: vol. 2, Issue 1, 2018, pp. 24-30, ISSN 2468-6530, https://doi.org/10.1016/j.oret.2017.03.015 (Year: 2018).*

De Fauw et al., "Clinically Applicable Deep Learning for Diagnosis and Referral in Retinal Disease", Nature Medicine, vol. 24, No. 9, Aug. 13, 2018, all pages.

Gerendas et al., "Computational Image Analysis for Prognosis Determination in Dme", Vision Research, vol. 139, May 9, 2017, pp. 204-210.

Irvine et al., "Inferring Diagnosis and Trajectory of Wet Age-related Macular Degeneration From Oct Imagery of Retina", Progress in Biomedical Optics and Imaging, Spie—International Society for Optical Engineering, vol. 10134, 2017, pp. 1013439-1-1013439-10.

Application No. PCT/US2020/055233 , International Preliminary Report on Patentability, Mailed on May 5, 2022, 11 pages.

Application No. PCT/US2020/055233 , International Search Report and Written Opinion, Mailed on Jan. 18, 2021, 17 pages.

European Application No. 19205315.5, Extended European Search Report, mailed Apr. 23, 2020, 76 pages.

Schlegl et al., "Fully Automated Detection and Quantification of Macular Fluid in OCT Using Deep Learning", Ophthalmology, vol. 125, No. 4, Dec. 8, 2017, pp. 549-558.

Schmidt-Erfurth et al., "Machine Learning to Analyze the Prognostic Value of Current Imaging Biomarkers in Neovascular Age-Related Macular Degeneration", Ophthalmology Retina, vol. 2, No. 1, May 31, 2017, pp. 24-30.

"Office Action", issued by the Japanese Patent Office for counterpart application No. JP2022-523895 on Jun. 14, 2024, 14 pages.

* cited by examiner

MACHINE-LEARNING TECHNIQUES FOR PREDICTION OF FUTURE VISUAL ACUITY

CROSS REFERENCE TO RELATED APPLICATIONS

The present application is a continuation of International Application No. PCT/US2020/055233 filed Oct. 12, 2020, which claims priority to and the benefit of European Patent Application No. 19205315.5, filed on Oct. 25, 2019, the disclosure of which is hereby incorporated by reference herein in its entirety and for all purposes.

FIELD

Methods and systems disclosed herein relate generally to systems and methods for predicting a future visual acuity of a subject by using segment-processing machine-learning models and metric-processing machine-learning models.

BACKGROUND

Eye-related diseases may cause severe vision loss among individuals. For example, macular degeneration is one of the leading causes of severe, irreversible vision loss which occurs when a macula region of the retina deteriorates. Typically, early stages of certain eye-related diseases show little to no symptoms and do not cause vision loss. In later stages, however, vision loss can occur suddenly and unexpectedly due to the eye-related diseases. Early and appropriate treatment of eye-related diseases can prevent advanced progression and improve the chances of retaining optimal visual acuity for a given subject. Treatment options may include injection of an anti-angiogenic drug into an eye, laser therapy to destroy an actively growing abnormal blood vessels, and photodynamic laser therapy, which employs a light-sensitive drug to damage abnormal blood vessels.

Relative efficacies of treatment options can depend on characteristics of a subject and/or a given condition state. However, efficacy predictors are not fully known, making treatment selection challenging. Moreover, after a treatment is selected and initiated for a given subject, a long period of time may be needed to discover whether the treatment is effective for the subject. By the time the particular treatment is found to be ineffective, a window of opportunity for early use of another treatment may have passed for the subject. This may decrease the chances of the subject's recovery from eye-related diseases.

Conventional techniques have attempted to use machine-learning models to predict a future visual acuity of a subject. For example, SCHMIDT-ERFURTH, ET AL: "Machine Learning to Analyze the Prognostic Value of Current Imaging Biomarkers in Neovascular Age-Related Macular Degeneration", OPHTHALMOLOGY RETINA, vol. 2, no. 1, 1 Jan. 2018 (2018-01-01), pages 24-30 discloses processing images using machine-learning models to predict the visual acuity after one year of a standardized anti-vascular endothelial-growth-factor (anti-VEGF) therapy. In this example, statistical analyses of the machine-learning models revealed that an initial visual acuity in response to an initial anti-VEGF treatment were most impactful on the prediction of the future visual acuity. The statistical analyses also revealed that deformities in the retina-related structures were found to be largely irrelevant for the prediction.

As another example, GERENDAS, ET AL: "Computational image analysis for prognosis determination in DME", VISION RESEARCH, vol. 139, 9 May 2017 (2017-05-09), pages 204-210 discloses using machine-learning models (e.g., a random-forest regression model) to predict a future visual acuity of a subject with diabetic macular edema. In this example, statistical analyses revealed that morphological features corresponding to areas of retinal fluid significantly contribute to a baseline visual acuity and that morphological features corresponding to a retinal thickness of retinal structures significantly contribute to a visual acuity of a subject after one year of treatment. The identified sets of morphological features are mostly directed areas and thickness of particular retinal structures. Moreover, this example system generates the prediction of visual acuity based on input images spanning across varying time points (e.g., week 12, week 24) to generate a prediction of visual acuity. This is different from generating a prediction of future visual acuity based on images collected at baseline time point (e.g., week 0).

In yet another example, IRVINE J M ET AL: "Inferring diagnosis and trajectory of wet age-related macular degeneration from OCT imagery of retina", PROGRESS IN BIOMEDICAL OPTICS AND IMAGING, SPIE, vol. 10134, 3 Mar. 2017 (2017-03-03), pages 1013439-1013439 discloses processing OCT images using machine-learning models to generate a binary output predicting whether a visual acuity of a subject improves in response to a particular treatment, but does not disclose predicting a visual acuity of the subject at a particular time point.

Other conventional techniques may use machine-learning models to process optical-coherence-tomography (OCT) images, but they do not predict a future visual acuity of a given subject. For example, US 2018/0132725 A1 discloses using convolutional neural networks to detect image objects corresponding to certain retinal fluids (e.g., intra-retinal cystoid fluid, subretinal fluid), but does not disclose predicting a future visual acuity of a subject. In another example, DE FAUW J ET AL: "Clinically applicable deep learning for diagnosis and referral in retinal disease", NATURE MEDICINE, vol. 24, no. 9, 13 Aug. 2018 (2018-08-13), pages 1342-1350 discloses predicting severity of sight-threatening retinal diseases of a subject using a classification network, but does not disclose predicting a future visual acuity of a subject.

Accordingly, there is a need to more quickly and accurately characterize prognosis of eye-related conditions (e.g., a future visual acuity of a given subject) to facilitate quick identification of an effective treatment.

SUMMARY

In some embodiments, a computer-implemented method is provided. The computer-implemented method can include processing, using one or more first models, an image of at least part of a retina of a subject to detect a set of retina-related segments. The image may be an OCT image. Each retina-related segment of the set of retina-related segments may include a retinal structure or a type a set of segment-specific metrics. The computer-implemented method may also include generating a set of segment-specific metrics. Each of the set of segment-specific metrics may characterize a retina-related segment of the set of retina-related segments. The computer-implemented method can include processing the set of segment-specific metrics using a second model to generate a result corresponding to a prediction corresponding to a future visual acuity of the subject. The computer-implemented method can include outputting the result.

The first models may include a deep-convolutional neural network. In some instances, the first models includes an intra-retinal layer segmentation algorithm. The first model of the one or more first models can be used to detect a segment corresponding to the type of retinal fluid, and another model of the one or more first models can be used to detect a segment corresponding to the retinal structure. The second model may include a trained gradient-boosting machine.

A retina-related segment of the set of retina-related segments may include a particular retinal structure that indicates one or more retinal layers of the retina (e.g., a nerve-fiber layer, a ganglion-cell layer). The particular retinal structure may indicate one or more parts of the retina located beneath a retinal pigment epithelium, the one or more parts of the retina including a Bruch's membrane, a choroid, and a sclera. A retina-related segment of the set of retina-related segments can indicate a pigment epithelial detachment of the retinal structure. A retina-related segment of the set of retina-related segments may also include a particular type of retinal fluid that includes a sub-retinal fluid (SRF) or intra-retinal fluid (IRF). A retina-related segment of the set of retina-related segments can indicate one or more deformities present in the retina, the one or more deformities including a macular hole, a macular plucker, and a deteriorated macula.

The result may indicate a prediction that the future visual acuity of the subject at a particular future time point will exceed a predetermined acuity threshold. A segment-specific metric of the set of segment-specific metrics may indicate a fluid volume corresponding to the intra-retinal fluid, in which a lower value corresponding to the fluid volume may increase a likelihood that the future visual acuity of the subject at a particular future time point will exceed a predetermined acuity threshold. A segment-specific metric of the set of segment-specific metrics may also indicate a fluid volume corresponding to the sub-retinal fluid, in which a higher value corresponding to the fluid volume may increase a likelihood that the future visual acuity of the subject at a particular future time point will exceed a predetermined acuity threshold.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
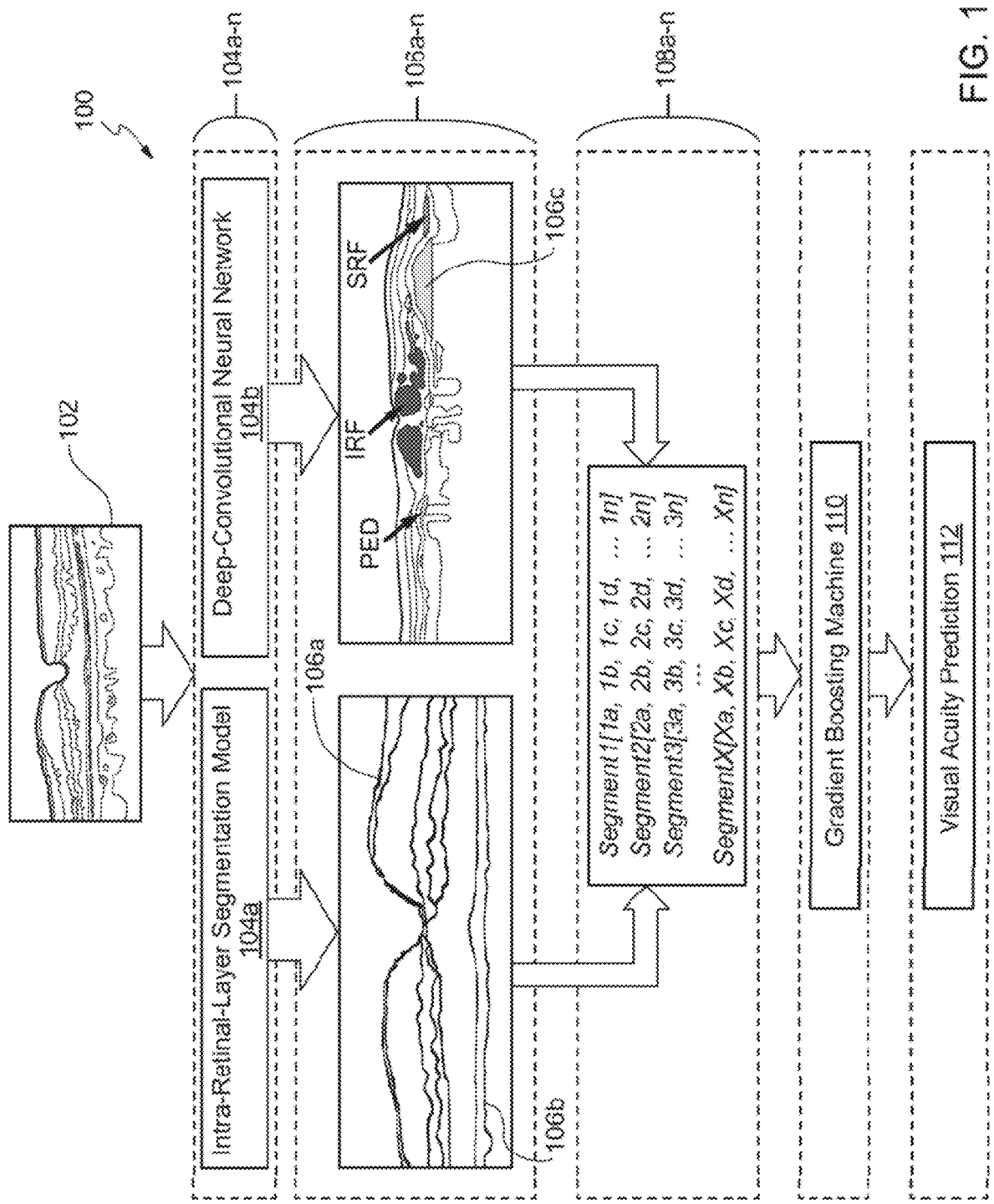
FIG. 1 illustrates an example processing scheme for using machine-learning models to generate a prediction corresponding to a future visual acuity of a subject.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

To address at least the above deficiencies of conventional machine-learning systems, the present techniques use machine-learning models to generate a prediction corresponding to a future visual acuity of a subject. An image depicting at least part of a retina of a subject can be processed by a segment-detecting machine-learning model to detect a set of retina-related image segments that correspond to a retinal structure or a type of retinal fluids. For each retina-related image segment of the detected set of retina-related image segments, segment-specific metrics can be generated. A segment-specific metric may relate to (for example) a relative location, width, depth, curvature or degree of homogeneity of a segment. The segment-specific metrics corresponding to the set of retina-related image segments can be processed using a metric-processing machine-learning model to generate a result corresponding to a prediction corresponding to a future visual acuity of a subject. The result may also correspond to a predicted response to a treatment (e.g., anti-VEGF therapy) for a subject diagnosed with neovascular age-related macular degeneration. In some embodiments, the prediction is generated by which contribution of certain metrics (e.g., a fluid volume of a retinal fluid) is higher than contributions from other metrics (e.g., a thickness of a retinal structure).

The image depicting at least part of the retina of the subject can be captured at a particular time point, and the result can correspond to the prediction of visual acuity at a future time point (e.g., 12-months from the date the image was captured). In some instances, the result is generated based solely on the image of the subject captured at a time point. To detect the set of retina-related image segments from the image, a segment-detecting machine-learning model can be used. For example, an intra-retinal-layer segmentation algorithm can be used to detect retinal structures (e.g., retinal layers), and/or a deep-convolutional neural network (in another example) can be used to detect types of retinal fluid. The types of retinal fluid may include an intra-retinal fluid, a sub-retinal fluid and/or a fluid between Bruch's membrane and retinal pigment epithelium (e.g., that causes pigment epithelial detachment).

Each of the set of segment-specific metrics may characterize a retina-related segment of the set of retina-related segments. For example, when a retina-related image segment includes a retinal fluid, a segment-specific metric may include a volume or thickness of the fluid (e.g., a central-subfield thickness). In another example, the segment-specific metrics corresponding to a retinal structure (e.g., retinal pigment epithelium) may include central-subfield thickness and central-subfield volume between the retinal structure and another retinal structure (e.g., inner limiting membrane). A metric-processing machine-learning model can learn an extent to which various metrics are predictive of a future visual acuity of the subject. For example, higher central-subfield thickness metrics corresponding to a sub-retinal fluid segment may be predictive that a future visual acuity of the subject will improve. Lower central-subfield thickness metrics corresponding to an intra-retinal fluid may also be predictive that a future visual acuity of the subject will improve.

A particular segment-specific metric (e.g., an amount of fluid volume corresponding to the type of retinal fluid) can be a primary indicator for determining a future visual acuity of the subject relative to a degree to which each of one, more or all other metrics indicates a future visual acuity. In some instances, a particular segment-specific metric is characterized as a primary indicator of a future visual acuity when a contribution of the particular segment-specific metric to the prediction of future visual acuity of the subject is higher than each contributions from one, more or all other segment-specific metrics. In some instances, the contribution of the particular segment-specific metric is determined by aggregating one or more values (e.g., Shapley values) calculated for each instance of a given segment-specific metric.

The segment-specific metric corresponding to the primary indicator can be determined by: (i) accessing information processed by the trained metric-processing machine-learning model; (ii) generating, based on the accessed information, a plot that indicates, for each segment-specific metric, one or more values indicative of a contribution to the prediction of future visual acuity of the subject; and (iii) selecting, from the plot, a segment-specific metric estimated as having the highest contribution to the prediction of future visual acuity of the subject. In some instances, the plot is a Shapley Additive exPlanations plot that generates a ranking among the set of segment-specific metrics based on their relative contribution to the prediction of the future visual acuity of the subject.

In some instances, the segment-specific metric corresponding to the primary indicator is determined by using a local interpretable model-agnostic explanation (LIME). LIME focuses on training local surrogate models to explain individual predictions corresponding to a future visual acuity of the subject (for example). In LIME, the goal is to understand why the machine learning model (e.g., the metric-processing machine-learning model) makes a certain prediction. LIME generates a new dataset including variations (e.g., permuted samples) of an input sample and the corresponding predictions by the underlying machine learning model. For example, OCT images depicting at least part of a retina of the subject can be processed to generate the permuted samples for LIME. An interpretable model is then trained using this new dataset. The interpretable model can be, for example, a least absolute shrinkage and selection operator (Lasso) or a decision tree. The trained interpretable model may be used to approximate the predictions of the underlying machine learning model for variations of the input sample (local fidelity), but does not need be a good global approximation for all input samples. A local surrogate model may be obtained by: (1) selecting a sample of interest for which an explanation for the prediction by an underlying machine learning model may be needed; (2) perturbing the sample of interest and generating the predictions for the perturbed samples by the underlying machine learning model; (3) weighing the perturbed samples according to their proximity to the sample of interest; and (4) training a weighted, interpretable model using the perturbed samples and the corresponding predictions by the underlying machine learning model. The prediction of the sample of interest by the underlying machine learning model may then be explained by interpreting the trained interpretable model.

An alternative technique for identifying a primary indicator of a future visual acuity is to identify, for each of a set of metrics, one or more learned weights associated with the metric. For each metric, a contribution value may be defined as for (example) a maximum, minimum, median or mean of the one or more learned weights or a learned weight of the one or more learned weights. A primary indicator may be defined to be a metric associated with a highest contribution.

Another technique for identifying a primary indicator is to fit or train a machine-learning model using a set of modified testing data sets. Each of the set of modified testing data sets may lack one or more particular metrics in the input data. An accuracy (e.g., $R^2$ value, standard error, etc.) can be calculated for each of the testing data sets, and a primary indicator may be defined to be a metric that is absent in the testing data set(s) for which the accuracy was the highest (or the error was the lowest) relative to other testing data sets.

Yet another exemplary technique for identifying a primary indicator is to design a particular input data set that includes data points spanning a range of values for each metric. The particular input data set may, for example, correspond to a linear or non-linear multi-dimensional grid across an input space. A trained model may then be used to generate, for each input data element (e.g., which can include values for multiple metrics), a predicted future visual acuity. For each metric, a magnitude and/or significance of a relationship between the predictions and values of the metrics may be determined. One or more primary indicators may be defined as the metric(s) associated with the highest (or above-threshold) metric(s) and/or the most significant significance values (e.g., p-values below a threshold).

It will be appreciated that input variables used during training, used to identify contributions and/or used to identify a primary indicator may be normalized and/or standardized. It will also be appreciated that some input variables may be related and/or non-independent. In these circumstances, the related variables may be collectively assessed (e.g., by collectively assessing weights across the related variables, by removing each of the variables that relate to each other from a modified data set or by collectively analyzing a magnitude or significance of a relationship between values along an input-data axis associated with the related variables are related to model predictions.

An identified segment-specific metric identified as being a primary indicator can be further used to improve performance of the metric-processing machine-learning model. For example, a recursive feature elimination operation can be performed to remove segment-specific metrics determined to contribute to the prediction by less than a threshold amount. In another example, a hyperparameter (e.g., a number of layers in a neural network, learning rate) tuning operation can be performed to optimize identification of metrics corresponding to one or more primary indicators of for determining a degree of a future enhancement of a visual acuity of the subject.

The metric-processing machine-learning model used to process the set of segment-specific metrics can be different from the types of segment-detecting machine-learning models that are used for detecting retina-related image segments. For example, a metric-processing machine-learning model used to process segment-specific metrics can include a gradient-boosting machine. A result output by the metric-processing machine-learning model can correspond to (for example) a predicted future visual acuity of a subject (e.g., at a particular time), a predicted 20/40 best-corrected visual acuity (BCVA) value (e.g., at a particular time point), a prediction as to whether a future visual acuity of the subject will exceed a predetermined acuity threshold (e.g., at a particular time).

Accordingly, embodiments of the present disclosure provide a technical advantage over conventional systems by more accurately generating an individualized prediction corresponding to the future visual acuity of the subject. Rather than using a single type of a machine-learning model to process images, segment-detecting machine-learning models and metric-processing machine-learning models can be used in the same sequence to increase accuracy of the predicted future visual acuity. Further, by using the metric-processing machine-learning models to learn an extent to which various metrics are predictive of a future visual acuity of the subject, the segment-detecting machine-learning models can be further trained to differentially weight retina-related image segments based on a degree to which individual segment types are predictive future visual acuity of the subject. This may result in a machine-learning system that is more accurate as compared to the conventional systems.

II. Example Computing Environment for Using Machine-Learning Models for Predicting a Future Visual Acuity FIG. 1 illustrates an example processing scheme 100 for using machine-learning models to generate a prediction corresponding to a future visual acuity of a subject. The processing scheme 100 may include accessing an image 102 and processing the image 101 using a set of segment-detecting machine-learning models 104a-n. The set of segment-detecting machine-learning models 104a-n may include an intra-retinal-layer segmentation algorithm 104a and a machine-learning model (e.g., a convolutional neural network, a deep neural network or a deep-convolutional neural network 104b). The set of segment-detecting machine-learning models can detect a set of retina-related image segments 106a-n (e.g., an image segment depicting a type of fluid, a retinal layer, particular vasculature, or a particular retinal abnormality). A set of segment-specific metrics 108a-n can be generated based on the set of retina-related image segments 106a-n. Each segment-specific metrics of the set of segment-specific metrics 108a-n can correspond to a retina-related image segment of the set of retina-related image segments 106a-n. A segment-specific metric 108 may relate to (for example) a relative location, width, depth, curvature or degree of homogeneity of a segment. In some instances, a segment-specific metric 108 may relate to multiple segments of the set of retina-related image segments 106a-n (e.g., an average, median, maximum or minimum distance between two segments). The set of the set of segment-specific metrics 108a-n can be processed by using a metric-processing machine-learning model 110, which may output a visual-acuity prediction 112. The visual-acuity prediction 112 may be a predicted future visual acuity of the subject (e.g., at a particular time). The predicted future visual acuity may include a predicted precise acuity value or an indication as to whether it is predicted that a given acuity-based condition is satisfied.

II.A. Training the Machine-Learning Models for Predicting the Future Visual Acuity The machine-learning models for predicting the future visual acuity of the subject (e.g., the segment-detecting machine-learning models 104a-n, the metric-processing machine-learning model 110) can be trained using supervised training algorithms. The supervised training algorithms may be used to train the machine-learning models to generate outputs corresponding to linear and/or logistic regression values corresponding to the prediction corresponding to the future visual acuity. The machine-learning models can be trained based on training datasets. The training datasets can be derived from clinical trial data, such as clinical data based on "A Study of Ranibizumab Administered Monthly or on an As—needed Basis in Patients With Subfoveal Neovascular Age-related Macular Degeneration" (hereinafter referred to as "the HARBOR clinical data"). The training datasets may include a set of training images. Each training image of the set of training images can be labeled with a visual acuity of the subject at a particular time point set relative to a date on which the training image was collected (e.g., 12 months from the date when the training image was collected). Each training image of the set of training images can be labeled with information corresponding to treatment characteristics, including: (1) a time point relative to an initiation of a treatment for an eye-related disease (e.g., 1 month after the initiation, 2 months after the initiation); (2) a dosage of the treatment; and (3) frequency pattern of the treatment. Additionally or alternatively, each training image of the set of training images can be labeled with information representative of characteristics of a subject corresponding to the training image. The information representative of the characteristics of the subject may include age, gender, and/or visual acuity of the subject at a date on which the training image was collected.

Various types of cost functions can be used for training the machine-learning models. The cost functions may include linear cost functions, quadratic cost functions, and cubic cost functions. In some instances, a backpropagation technique can be used to facilitate learning of weights associated with the machine-learning models for predicting the future visual acuity of the subject. The backpropagation may use, for example, a stochastic gradient descend (SGD) algorithm to cumulatively update the parameters of the hidden layers. Learned parameters may include, for instance, weights, biases, and/or other hidden layer-related parameters, which can be stored in a parameter data store.

II.B. Input Data for Predicting the Future Visual Acuity

The image 102 can be a two- or three-dimensional image that may depict at least part of a retina of the subject. The image 102 may depict a cross-section portion of the retina at a micrometer-level precision, at which the cross-section portion can indicate different parts including a retinal pigment epithelium layer or a Bruch membrane (for example). To capture the image 102, various types of medical-imaging techniques can be used. For example, the image 102 depicting a part of the retina can be captured by using an optical-coherence tomography (OCT) that utilizes low-coherence light. Other examples of medical-imaging techniques may include spectral-domain optical-coherence tomography (SD-OCT), wide-field optical-coherence tomography, optoacoustic imaging. and scanning laser ophthalmoscopy.

The image 102 may be captured to depict at least part of the retina corresponding to subjects under various states. For example, the image 102 may correspond to a subject diagnosed with an eye-related disease (e.g., macular degeneration). A treatment may or may not have yet been identified and/or initiated for the subject. The image 102 can be processed to generate a future visual acuity that can be used to identify a treatment predicted to be effective (e.g., to meet a treatment-efficacy target or relative to other treatment options) in treating or improving symptoms associated with the eye-related disease. In another example, the image 102 may correspond to a subject undergoing a treatment for an eye-related disease. The image 102 described in such example can be processed to generate a future visual acuity that can be used to identify whether the current treatment is effective in treating or improving symptoms associated with the eye-related disease. If the future visual acuity indicates otherwise, a different treatment can be selected for the subject. To generate the future visual acuity of the subject, the captured image 102 can be processed by the segment-processing machine learning models 104a-n to reveal information that can be predictive of the future visual acuity of the subject.

II.C. Segment-Processing Machine-Learning Models for Detecting Image Segments within an Input Image The image 102 can be processed by the segment-processing machine-learning models 104a-n to detect the set of retina-related image segments 106a-n. A retina-related image segment (e.g., a retina-related image segment 106a) may refer to a pixel region within an image (e.g., an image 102c) that corresponds to a part associated with the retina. The part associated with the retina may correspond a type of a retinal structure. The type of the retinal structure may include a single retinal layer and/or multiple retinal layers. Examples of the retinal layers may include one or more of:
1. Inner-limiting membrane;
2. Nerve-fiber layer;
3. Ganglion-cell layer;
4. Inner-plexiform layer;
5. Inner-nuclear layer;
6. Outer-plexiform layer;
7. Outer nuclear layer;
8. External limiting membrane;
9. Photoreceptor layers;
10. Retinal pigment epithelium;
11. Bruch's Membrane;
12. Choriocapillaris; and
13. Choroidal stroma.

The types of the retinal structure may include additional structures that are located beneath the retinal pigment epithelium, including a Bruch's membrane, a choroid, and a sclera. The detected retinal structure may indicate deformities present in the retina, such as a macular hole, a macular plucker, and a deteriorated macula. The type of the retinal structure can be identified based on a location at which the retina-related image segment was detected by the segment-processing machine-learning models 104a-n. For example, the type of the retinal structure can be identified as the inner-limiting membrane if the detected location of the retina-related image segment is at the top part of the image 102.

In addition to the retinal structure, the part associated with the retina may also correspond to types of retinal fluids such as an intra-retinal fluid, a sub-retinal fluid (e.g., that may indicate macular edema), and/or a fluid between Bruch's membrane and retinal pigment epithelium (e.g., that causes pigment epithelial detachment).

II.C.1 Intra-Retinal-Layer Segmentation Algorithm for Detecting Image Segments Corresponding to a Retinal Structure Various types of the segment-processing machine learning models 104a-n can be used to detect the set of retina-related image segments 106a-n. The segmentation process may initiate by generating multiple copies of the image 102. A first copy of the image 102 can be processed using the intra-retinal-layer segmentation algorithm 104a to detect image segments (e.g., retina-related image segments 106a-d) corresponding to the retinal structures (e.g., retinal layers). For the first copy of the image 102, the intra-retinal-layer segmentation algorithm 104a may detect a plurality of retinal surfaces within the image. To process the first copy of the image 102, the first copy of the image 102 can be pre-processed via an anisotropic diffusion operation so as to reduce image noise associated with the image 102. The pre-processed image can be processed by the intra-retinal-layer segmentation algorithm 104a to detect a set of edges. The edges can be identified based on bright-to-dark and/or dark-to-bright transitions of pixel regions in the pre-processed image. Alternatively or additionally, the set of edges can be identified based on dark, medium, and/or bright intensity pixel regions within the pre-processed image. In some instances, a 1-D peak detection algorithm can be used to detect the set of edges from the pre-processed image. Based on the set of edges, the retinal surfaces can be detected by the intra-retinal-layer segmentation algorithm 104a.

A retinal surface of the plurality of retinal surfaces can be associated with an identifier that indicates a border between two retinal layers. For example, the retinal surface detected by the intra-retinal-layer segmentation algorithm 104a may be associated with an identifier RNFL-GCL, which indicates that the retinal surface serve as a border between the retinal-nerve-fiber layer and the ganglion-cell layer. The intra-retinal-layer segmentation algorithm 104a may designate a region between two adjacent retinal surfaces as a retina-related image segment corresponding to a retinal layer. Based on the respective identifiers of the two adjacent retinal surfaces, the intra-retinal-layer segmentation algorithm 104a identify a type of the retinal structure such as the inner-plexiform layer. The intra-retinal-layer segmentation algorithm 104a may iterate the above operations for all of the retinal surfaces to detect the retina-related image segments (e.g., the retina-related image segments 106a-d) that correspond to the retinal structures.

Various types of intra-retinal-layer segmentation algorithms can be used to detect the retinal structures (e.g., retinal layers). The types may include, but are not limited to, a Sprectralis SD-OCT system, an IOWA Reference Algorithm, an Automated Retinal Analysis tools (AURA), a Dufour's Algorithm, and an OCTRIMA3D system.

II.C.2 Deep-Convolutional Neural Network for Detecting Image Segments Corresponding to Types of Retinal Fluid To detect retina-related image segments (e.g., retina-related image segments 106e-g) that correspond to other parts associated with the retina, the deep-convolutional neural network 104b can be used. A second copy of the image 102 can be processed by the deep-convolutional neural network 104b to detect a retina-related image segment (e.g., a retina-related image segment 106e) that corresponds to a type of retinal fluids, including an intra-retinal fluid, a sub-retinal fluid (e.g., that may indicate macular edema), and/or a fluid between Bruch's membrane and retinal pigment epithelium (e.g., that causes pigment epithelial detachment). The deep-convolutional neural network 104b may access the second copy of the image 102 and process the second copy through a series of hidden convolutional layers (e.g., convolution, ReLU layer, pooling layer) which can be used to detect retina-related image segments (e.g., the retina-related image segments 106e-g) within the second copy of the image 102. For each retina-related image segment of the detected retina-related segments, the deep-convolutional neural network 104b can use a fully connected layer (e.g., multi-perceptron neural network having a softmax layer) that may generate a result that corresponds to an estimation of a type of a retina fluid for the retina-related image segment. As a result, the retina-related image segments (e.g., the retina-related image segments 106e-g) that correspond to the types of retinal fluids.

II.D. System for Generating Segment-Specific Metrics

The set of segment-specific metrics 108a-n can be generated based on the set of retina-related image segments 106a-n. Each segment-specific metrics of the set of segment-specific metrics 108a-n can correspond to a retina-related image segment of the set of retina-related image segments 106a-n. The segment-specific metrics may be associated with different types of metrics based on a type of the retina-related image segment. For example, the segment-specific metrics corresponding to a retinal structure (e.g., retinal pigment epithelium) may include central-subfield thickness and central-subfield volume between the retinal structure and another retinal structure (e.g., inner limiting membrane). Each of the central-subfield thickness and central-subfield volume may also indicate a particular location in the retina from which the metrics were identified. The particular location may be a value ranging between 1 and 9 within an Early Treatment Diabetic Retinopathy Study (ETDRS) grid. In another example, the segment-specific metrics corresponding to a type of retinal fluid (e.g., a sub-retinal fluid) may include total fluid volume and fluid volume at a particular location (e.g., ETDRS location) within the retina. Additionally and alternatively, the segment-specific metrics of the set of segment-specific metrics 108a-n may be supplemented with additional set of metrics, including a gender of the subject, an age of the subject, a best-corrected-visual acuity (BCVA) value corresponding to the subject.

II.E. Metric-Processing Machine-Learning Models for Generation a Prediction of a Future Visual Acuity The metric-processing machine-learning model 110 can process the set of segment-specific metrics 108a-n and generate the visual-acuity prediction 112 corresponding to the subject associated with the image 102. In some instances, the metric-processing machine-learning model 110 may include a gradient-boosting machine, which may include an ensemble of machine-learning models such as decision trees. Each segment-specific metrics of the set of segment-specific metrics can be processed by a sequence of the machine-learning models corresponding to the gradient-boosting machine, in which an intermediate output of a first machine-learning model of the ensemble can be used as an input to a second machine-learning model of the ensemble. The outputs corresponding to each of the set of segment-specific metrics can be aggregated to generate a final output corresponding to a prediction of a future visual acuity for the subject associated with the image 102 (e.g., the visual-acuity prediction 112).

In some instances the metric-processing machine-learning model 110 may include a deep-neural network. For each segment-specific metric (e.g., central-subfield thickness) of the set of segment-specific metrics 108a-n, the deep-neural network may assign the segment-specific metrics to a neuron of its input layer. The neurons of the input layers may pass the values as inputs for neurons corresponding to a hidden layer, in which each neuron computes an intermediate value based on the inputs, its parameter, and its associated activation function. The intermediate values can be provided as inputs for neurons of subsequent hidden layers of the deep-neural network, at which the computation process can be repeated for each hidden layer until the intermediate values arrive at an output layer of the deep-neural network. The output layer may output, based on the intermediate values, a result that corresponds to the visual-acuity prediction 112.

In some instances, the metric-processing machine-learning model 110 may include a random-forest regression model. The random-forest regression model may select a random sample including a subset of segment-specific metrics of the set of segment-specific metrics 108a-n. For each segment-specific metrics (e.g., fluid volume with ETDRS value of 3) of the random sample, the segment-specific metrics can be assigned to a decision tree of the random-forest regression model, which can generate an intermediate result corresponding to future visual acuity. The intermediate results generated by each decision tree can be aggregated to identify a final result that corresponds to the visual-acuity prediction 112. The final result can be (for example) a mean, median, summed, maximum, or minimum value of the intermediate results generated by the decision trees.

II.F. Practical Application of Future Visual Acuity

The visual-acuity prediction 112 can be used to predict the future visual acuity of the subject. The future visual acuity may indicate the visual acuity of the subject at a particular time point (e.g., 12 months from the date when the image 102 was captured). The visual-acuity prediction 112 may correspond to a result generated from the image 102 of the subject diagnosed with an eye-related disease (e.g., macular degeneration) for which a treatment is yet to be identified. In such cases, the visual-acuity prediction 112 can be used to identify a treatment that can be considered as most effective in treating or improving symptoms associated with the eye-related disease. For instance, a value corresponding to the visual-acuity prediction 112 may indicate predicted severity of the eye-related disease at a particular time point. Depending on the predicted severity corresponding to the visual-acuity prediction 112, a treatment can be selected. The treatment may include an injection of an anti-angiogenic drug into an eye, a laser therapy to destroy an actively growing abnormal blood vessels, and an photodynamic laser therapy, which employs a light-sensitive drug to damage abnormal blood vessels.

The visual-acuity prediction 112 may correspond to a result generated from the image 102 of the subject undergoing a treatment (e.g., the anti-VEGF therapy) for an eye-related disease. For such cases, the visual-acuity prediction 112 may indicate a future visual acuity of the subject at a particular time point and further indicate, based on the value corresponding to the visual-acuity prediction 112, whether the current treatment improved the visual acuity of the subject. To identify efficacy of the current treatment, the value corresponding to the visual-acuity prediction 112 can be compared to a visual-acuity value (e.g., the BCVA) corresponding to the subject associated with the image 102. The compared value can indicate an extent of the improvement of the visual acuity of the subject. Additionally or alternatively, the value corresponding to the visual-acuity prediction 112 can be compared to a predetermined acuity threshold. If the value corresponding to the visual-acuity prediction 112 exceeds the predetermined acuity threshold, the current treatment can be maintained. If the value corresponding to the visual-acuity prediction 112 does not exceed the predetermined acuity threshold, a different treatment (e.g., the photodynamic laser therapy) can be selected for the subject.

Figure 2:
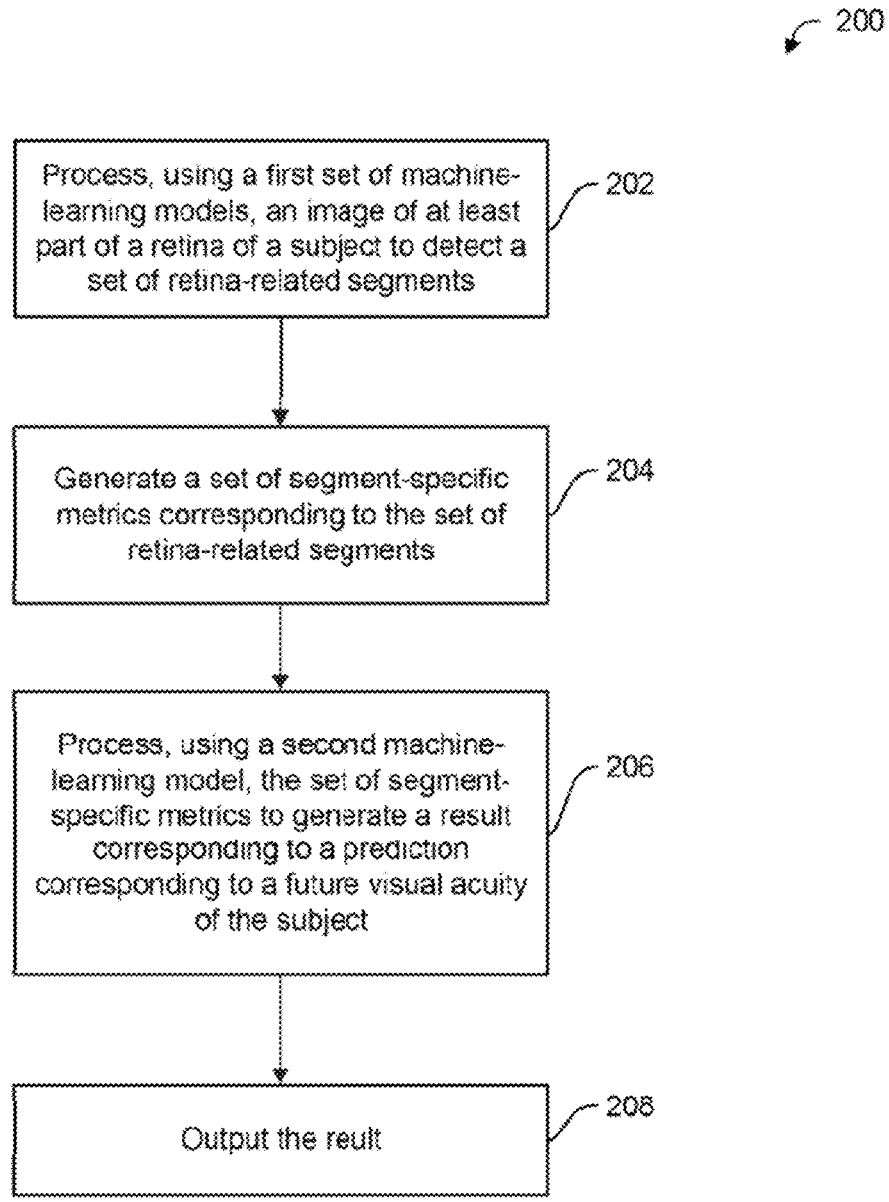
FIG. 2 illustrates a process for using machine-learning models to generate a prediction corresponding to a future visual acuity of a subject.

III. Example Process for Using Machine-Learning Models for Predicting a Future Visual Acuity FIG. 2 illustrates a process 200 for using machine-learning models to generate a prediction corresponding to a future visual acuity of a subject. The process begins at block 202. An image of at least part of a retina of a subject can be processed using a first set of machine-learning models to detect a set of retina-related segments. The image may be captured using an OCT system (e.g., an SD-OCT system). A retina-related segment of the set of retina-related segments may correspond to a pixel region within the image that corresponds to a part associated with the retina. The retina-related segment can include a retinal structure or a type of retinal fluid. The retinal structure may include a single retinal layer and/or multiple retinal layers, such as a nerve-fiber layer or Bruch's membrane. The type of retinal fluid may include a sub-retinal fluid, an intra-retinal fluid, and a retinal pigment endothelium.

The first set of machine-learning models may include a set of segment-processing machine-learning models, in which different types of machine-learning models can be used to detect types of the retina-related segments. For example, an intra-retinal-layer segmentation algorithm may be used to detect retina-related segments corresponding to the retinal structure. The intra-retinal-layer segmentation algorithm can be used to detect the retinal structure from the image based on analyzing pixel intensity patterns in the image.

At block 204, a set of segment-specific metrics can be generated. Each segment-specific metric of the set of segment-specific metrics may characterize a retina-related segment of the set of retina-related segments. Based on a type of the retina-related segment, a corresponding segment-specific metric may be associated with different data types. For example, if the type of the retina-related segment is a retinal structure, the segment-specific metrics corresponding to a retinal structure (e.g., retinal pigment epithelium) may include central-subfield thickness and central-subfield volume between the retinal structure and another retinal structure (e.g., inner limiting membrane). In another example, if the type of retina-related segment is a type of retinal fluid, the segment-specific metrics corresponding to a type of retinal fluid (e.g., a sub-retinal fluid) may include total fluid volume and fluid volume at a particular location (e.g., ETDRS location) within the retina.

At block 206, the set of segment-specific metrics can be processed using a second machine-learning model to generate a result corresponding to a prediction corresponding to a future visual acuity of the subject. The second machine-learning model may include a metric-processing machine-learning model. For example, the metric-processing machine-learning model may correspond to a gradient boosting machine, which in turn may include an ensemble of machine-learning models such as decision trees. Each segment-specific metrics of the set of segment-specific metrics can be processed by a sequence of the machine-learning models corresponding to the gradient-boosting machine, in which an intermediate output of a first machine-learning model of the ensemble can be used as an input to a second machine-learning model of the ensemble.

The prediction corresponding to the future visual acuity of the subject may include a future visual acuity value at a particular time point set relative to a date on which the image was collected. In some instances, the prediction can further indicate whether the future visual acuity will exceed a predetermined acuity threshold (e.g., a 20/40-BCVA) at the particular time point.

At block 208, the result is outputted. For example, the result may be locally presented or transmitted to another device. The result may be output along with an identifier of the subject. The result can be used to identify an extent to which a type of a segment-specific metric contributes to the result. The result can be output with additional information that identifies characteristics of the subject (e.g., an age, a gender, a BCVA).

IV. Evaluation of Machine-Learning Models for Predicting Future Visual Acuity

Figure 3:
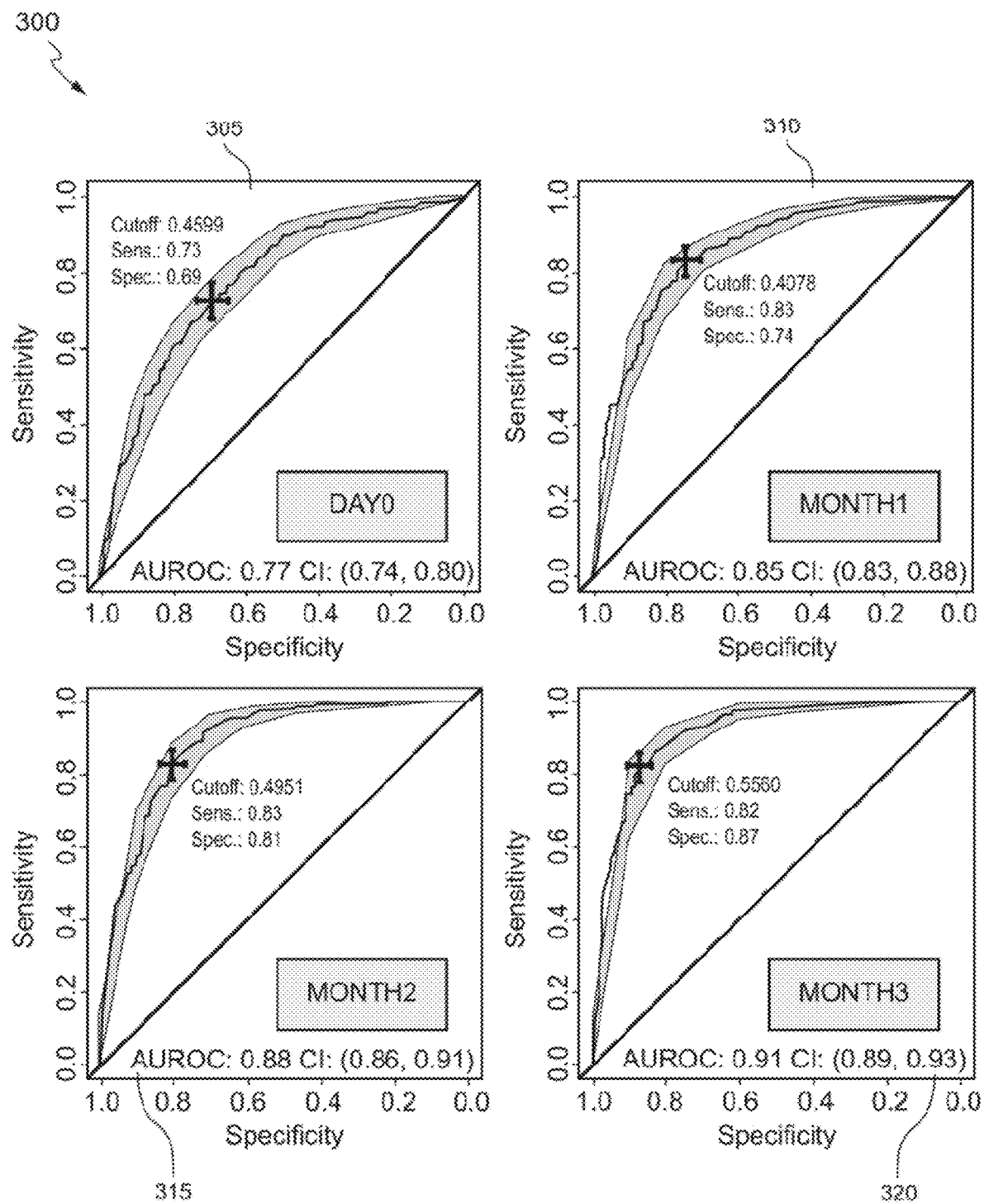
FIG. 3 shows a set of receiver-operating-characteristic (ROC) curves that convey accuracy data corresponding to outputs generated by trained image-segmenting machine-learning models and trained metric-processing machine-learning models as compared to actual observations.

IV.A. Evaluation of Machine-Learning Models for Predicting Whether the Future Visual Acuity Will Exceed a Predetermined Acuity Threshold FIG. 3 shows a set of receiver-operating-characteristic (ROC) curves 300 that convey accuracy data corresponding to outputs generated by trained image-segmenting machine-learning models and trained metric-processing machine-learning models as compared to actual observations. The set of receiver-operating-characteristic (ROC) curves 300 are presented to demonstrate that expanding a scope of training data to include training images collected at various time points can increase an overall accuracy of a prediction corresponding whether a future visual acuity at a particular time point will exceed a predetermined acuity threshold. Each of four depicted ROC curves 305, 310, 315, and 320 shows accuracy data (e.g., area-under-the-curve value) corresponding to an example set of trained machine-learning models. The set of trained machine-learning models included trained image-segmenting machine-models (e.g., the image-segmenting machine-learning models 104a-n) and a trained metric-processing machine-learning model (e.g., the metric-processing machine-learning model 110 of FIG. 1).

Each set of the four sets of machine-learning models was trained using training datasets (e.g., the HARBOR clinical data). The training datasets included a set of training images. Each training image of the set of training images was labeled with a visual acuity of the subject at a time point (e.g., 12 months from initiation of treatment). Different subsets of the training datasets were used to train each set of the four sets of machine-learning models that correspond to the ROC curves 305, 310, 315, and 320:

1. A first set of machine-learning models that correspond to the ROC curve 305 was trained using a first training dataset that includes 907 SD-OCT images (n=907) that correspond to captured image data of subjects at initiation of an anti-VEGF treatment;
2. A second set of machine-learning models that correspond to the ROC curve 310 was trained using the first training dataset and a second training dataset of 880 SD-OCT images (n=880) that correspond to captured image data of subjects at 1 month after the initiation of the anti-VEGF treatment;
3. A third set of machine-learning models that correspond to the ROC curve 315 was trained using the first training dataset, the second training dataset, and a third training dataset of 847 SD-OCT images (n=847) that correspond to captured image data of subjects at 2 months after the initiation of the anti-VEGF treatment; and
4. A fourth set of machine-learning models that correspond to the ROC curve 320 was trained using the first training dataset, the second training dataset, the third training dataset, and a fourth dataset of 816 SD-OCT images (n=816) that correspond to captured image data of subjects at 3 months after the initiation of the anti-VEGF treatment.

Across the four training datasets, the training datasets were associated with the subjects that received anti-VEGF treatments under various dose levels and treatment frequencies: (1) Ranibizumab 0.5 mg per month; (2) Ranibizumab 2.0 mg per month; (3) Ranibizumab 0.5 mg on as-needed basis; and (4) Ranibizumab 2.0 mg on as-needed basis. With respect to evaluation, the future visual acuity values were generated based on fivefold cross-validation procedure.

Following the training phase, each set of the four sets of trained machine-learning models were used to process unlabeled images (e.g., the image 102 of FIG. 1) and generate an output corresponding to the prediction corresponding to the future visual acuity associated with 12 months from a date on which the unlabeled images were collected. The prediction for each set of trained machine-learning models was subsequently used to determine whether the future visual acuity exceeded the predetermined acuity threshold. Exceeding the predetermined acuity threshold indicated that the subject at the particular time point will obtain a BCVA value above 20/40. The predicted data of the sets of trained machine-learning models were compared to actual observations that were derived from the same unlabeled images.

The ROC curve 305 shows accuracy data corresponding to the first set of trained machine-learning models trained with the first training dataset. For the ROC curve 305, the area under the curve (AUC) is 0.77±0.04, the sensitivity is 0.74±0.05, and the specificity is 0.70±0.05. The ROC curve 310 shows accuracy data corresponding to the second set of trained machine-learning models trained with the second training dataset (e.g., the set of training images depicting the retinas of the subjects at initiation of the anti-VEGF treatment and at 1 month after the initiation of the anti-VEGF treatment). For the ROC curve 310, the AUC is 0.85±0.03, the sensitivity is 0.83±0.04, and the specificity is 0.73±0.04.

The ROC curve 315 shows accuracy data corresponding to the third set of trained machine-learning models trained the third training dataset (e.g., the set of training images depicting the retinas of the subjects at initiation of the anti-VEGF treatment, at 1 month after the initiation of the anti-VEGF treatment, and at 2 months after the initiation of the anti-VEGF treatment). For the ROC curve 315, the AUC is 0.88±0.03, the sensitivity is 0.86±0.04, and the specificity is 0.78±0.04. The ROC curve 320 shows accuracy data corresponding to the fourth set of trained machine-learning models trained with the fourth training data set (e.g., the set of training images depicting the retinas of the subjects at initiation of the anti-VEGF treatment, at 1 month after the initiation of the anti-VEGF treatment, at 2 months after the initiation of the anti-VEGF treatment, and at 3 months after the initiation of the anti-VEGF treatment). For the ROC curve 320, the AUC is 0.91±0.02, the sensitivity is 0.87±0.04, and the specificity is 0.83±0.04.

Based on the AUC values derived from each of the ROC curves 305, 310, 315, and 320, training the machine-learning models using an expanded scope of the training data (e.g., the fourth training dataset spanning 3 months of labeled training images) can significantly increase accuracy of the prediction corresponding to the future visual acuity of the subject.

Figure 4:
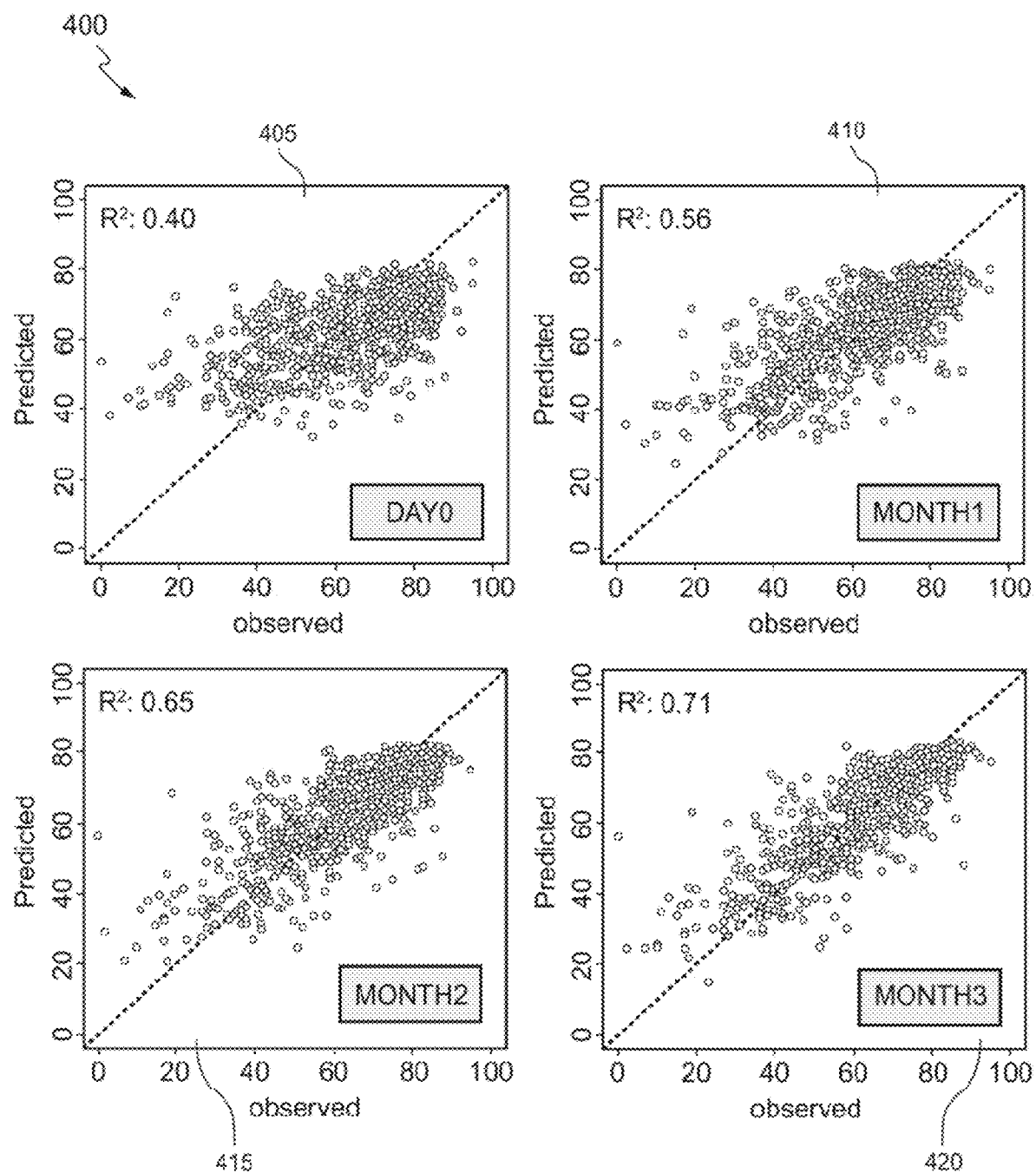
FIG. 4 shows a set of scatter-plot graphs that convey accuracy data corresponding to outputs generated by trained image-segmenting machine-learning models and trained metric-processing machine-learning models as compared to actual observations.

IV.B. Evaluation of Machine-Learning Models for Predicting Future Visual Acuity Values FIG. 4 shows a set of scatter-plot graphs 400 that convey accuracy data corresponding to outputs generated by trained image-segmenting machine-learning models and trained metric-processing machine-learning models as compared to actual observations. Similar to the evaluation presented above, the set of scatter-plot graphs 400 presented to demonstrate that expanding a scope of training data to include training images collected at various time points can increase an overall accuracy of a prediction corresponding a future visual acuity. Each of four scatter-plot graphs 405, 410, 415, and 420 shows accuracy data (R-squared value) corresponding to an example set of trained machine-learning models. The set of trained machine-learning models included trained image-segmenting machine-models (e.g., the image-segmenting machine-learning models 104*a-n*) and a trained metric-processing machine-learning model (e.g., the metric-processing machine-learning model 110 of FIG. 1).

Each set of the four sets of machine-learning models was trained using training datasets (e.g., the HARBOR clinical data). The training datasets included a set of training images. Each training image of the set of training images was labeled with a visual acuity of the subject at a time point (e.g., 12 months from initiation of treatment). Different subsets of the training datasets were used to train each set of the four sets of machine-learning models that correspond to the scatter-plot graphs 405, 410, 415, and 420:

1. A first set of machine-learning models that correspond to the scatter-plot graph 405 were trained using a first training dataset that includes 907 SD-OCT images (n=907) that correspond to captured image data of subjects at initiation of an anti-VEGF treatment;
2. A second set of machine-learning models that correspond to the scatter-plot graph 410 were trained using the first training dataset and a second training dataset of 880 SD-OCT images (n=880) that correspond to captured image data of subjects at 1 month after the initiation of the anti-VEGF treatment;
3. A third set of machine-learning models that correspond to the scatter-plot graph 415 were trained using the first training dataset, the second training dataset, and a third training dataset of 847 SD-OCT images (n=847) that correspond to captured image data of subjects at 2 months after the initiation of the anti-VEGF treatment; and
4. A fourth set of machine-learning models that correspond to the scatter-plot graph 420 were trained using the first training dataset, the second training dataset, the third training dataset, and a fourth dataset of 816 SD-OCT images (n=816) that correspond to captured image data of subjects at 3 months after the initiation of the anti-VEGF treatment.

Across the four training datasets, the training datasets were associated with the subjects that received anti-VEGF treatments under various dose levels and treatment frequencies: (1) Ranibizumab 0.5 mg per month; (2) Ranibizumab 2.0 mg per month; (3) Ranibizumab 0.5 mg on as-needed basis; and (4) Ranibizumab 2.0 mg on as-needed basis. With respect to evaluation, the future visual acuity values were generated based on fivefold cross-validation procedure.

Following the training phase, the four sets of trained machine-learning models were used to process unlabeled images (e.g., the image 102 of FIG. 1) and generate an output that corresponds to a prediction corresponding to a future visual acuity associated with 12 months from a date on which the unlabeled images were collected. Each output generated by each set of the four trained sets of machine-learning models was assigned to an y-axis value and an observed data derived from an unlabeled image used to generate the output was assigned to a corresponding x-axis value. The pair of x-and-y values that corresponds to a comparison between predicted output and the actual data was plotted on a scatter-plot graph (e.g., the scatter-plot graph 405). After all of the pairs of x-and-y values were plotted on the corresponding scatter-plot graph, an R-squared value for the scatter-plot graph was calculated.

The scatter-plot graph 405 shows accuracy data corresponding to the first set of trained machine-learning models trained with the first training dataset (e.g., images depicting retinas of the subjects at initiation of an anti-VEGF treatment). For the scatter-plot graph 405, the R-squared value is 0.40. The scatter-plot graph 410 shows accuracy data corresponding to the second set of trained machine-learning models trained with the second training dataset (e.g., images depicting the retinas of the subjects at initiation of the anti-VEGF treatment and at 1 month after the initiation of the anti-VEGF treatment). For the scatter-plot graph 410, the R-squared value is 0.56.

The scatter-plot graph 415 shows accuracy data corresponding to the third set of trained machine-learning models trained with the third training dataset (e.g., images depicting the retinas of the subjects at initiation of the anti-VEGF treatment, at 1 month after the initiation of the anti-VEGF treatment, and at 2 months after the initiation of the anti-VEGF treatment). For the scatter-plot graph 415, the R-squared value is 0.65. The scatter-plot graph 420 shows accuracy data corresponding to the fourth set of trained machine-learning models trained with the fourth training dataset (e.g., images depicting the retinas of the subjects at initiation of the anti-VEGF treatment, at 1 month after the initiation of the anti-VEGF treatment, at 2 months after the initiation of the anti-VEGF treatment, and at 3 months after the initiation of the anti-VEGF treatment). For the scatter-plot graph 420, the R-squared value is 0.71.

Based on the R-squared values derived from each of the scatter-plot graphs 405, 410, 415, and 420, training the machine-learning models using an expanded scope of the training data (e.g., the fourth training dataset spanning 3 months of labeled training images) can significantly increase accuracy of the prediction corresponding to the future visual acuity of the subject.

Figure 5:
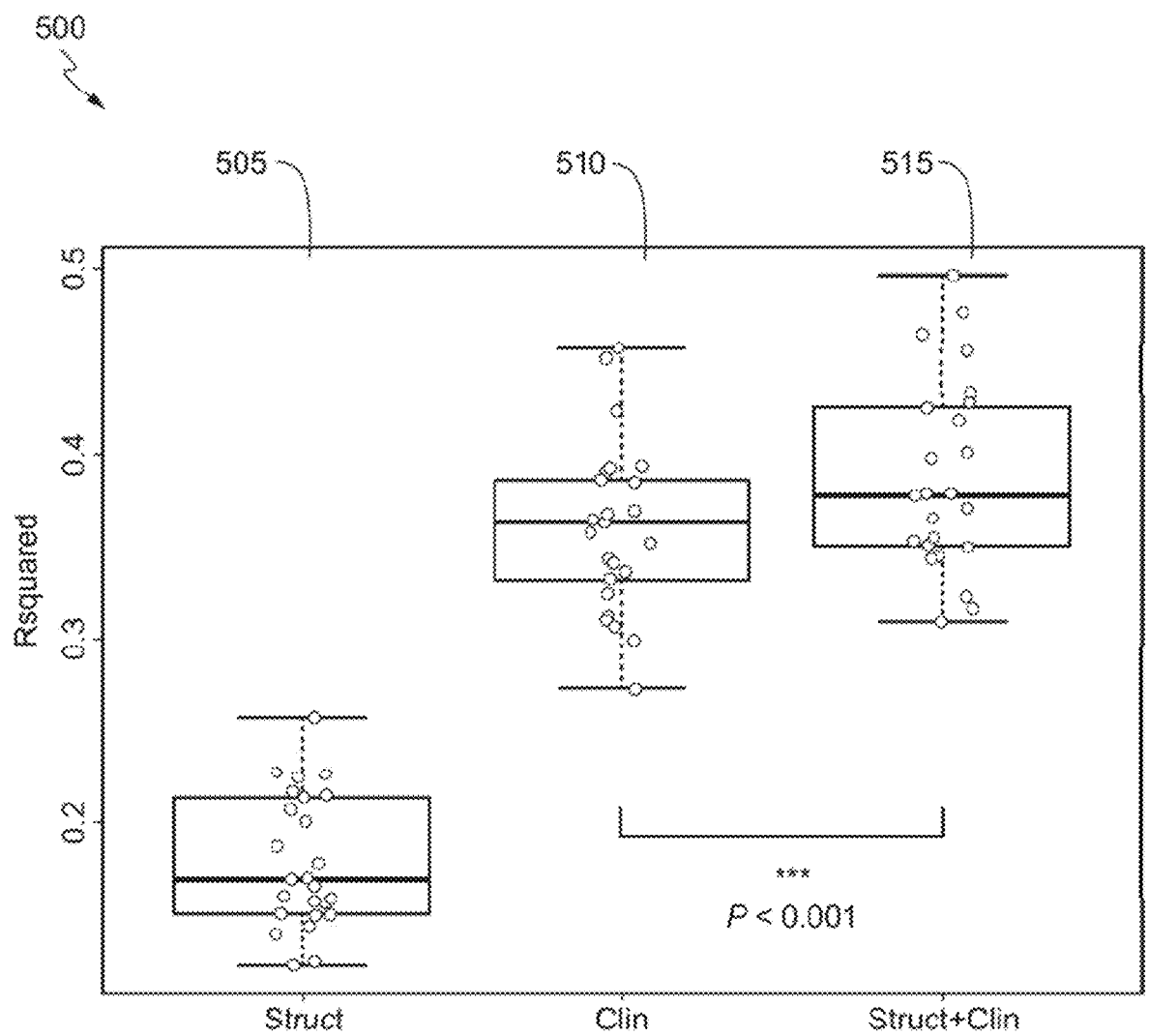
FIG. 5 shows a boxplot graph that illustrates an extent to which input data types can affect a prediction corresponding to a future visual acuity of a subject.

IV.C. Evaluation of Input Data Types that Contribute to the Future Visual Acuity FIG. 5 shows a boxplot graph 500 that illustrates an extent to which input data types can affect a prediction corresponding to a future visual acuity of a subject. The boxplot graph 500 shows which particular categories of data and their respective combinations may result in higher accuracy of the prediction corresponding to the future visual acuity of the subject. More specifically, the boxplot graph 500 shows whether generating a prediction of a future visual acuity based on a set of segment-specific metrics can be comparable to a prediction of a future visual acuity based on a combined set of segment-specific metrics and clinical metrics corresponding with the subject (e.g., an age, a gender, and a BCVA value). The boxplot graph 500 includes three boxplots 505, 510, and 515. Each of three boxplots 505, 510, and 515 corresponds to a distribution of accuracy data (R-squared value) corresponding to an example set of trained machine-learning models. The set of trained machine-learning models included trained image-segmenting machine-models (e.g., the image-segmenting machine-learning models 104*a-n*) and a trained metric-processing machine-learning model (e.g., the metric-processing machine-learning model 110 of FIG. 1).

Each set of the three sets of machine-learning models corresponding to the boxplots 505, 510, and 515 was trained using training datasets (e.g., the HARBOR clinical data). The training datasets included a set of training images. Each training image of the set of training images was labeled with a visual acuity of the subject at a time point (e.g., 12 months from initiation of treatment). All of the three sets of machine-learning models were trained using a training dataset that includes 907 SD-OCT images (n=907) that correspond to captured image data of subjects at initiation of an anti-VEGF treatment.

Following the training phase, each set of the three sets of trained machine-learning models was used to process different types of input data corresponding to unlabeled images (e.g., the image 102 of FIG. 1) and generate an output that corresponds to a prediction corresponding to a future visual acuity associated with 12 months from a date on which the unlabeled images were collected. The different types of input data is as follows:
1. A first set of trained machine-learning models that correspond to the boxplot 505 processed input data corresponding to only the segment-specific metrics generated from the segment-processing machine-learning models;
2. A second set of machine-learning models that correspond to the boxplot 510 processed input data corresponding to only a set of clinical metrics corresponding to the subject, including a gender of the subject, an age of the subject, a BCVA value of the subject; and
3. A third set of machine-learning models that correspond to the boxplot 515 processed input data corresponding to the segment-specific metrics generated from the segment-processing machine-learning models and the set of clinical metrics.

Each output generated from each set of the three sets of trained machine-learning models and an observed data derived from an unlabeled image used to generate the output were used to generate R-square values. The R-square values were plotted in a corresponding boxplot (e.g., the boxplot 505).

The boxplot 505 shows distribution of accuracy data corresponding to the first set of trained machine-learning models. The boxplot 505 also shows the extent to which the segment-specific metrics affected the prediction corresponding to the future visual acuity of the subject. For the boxplot graph 505, a median value corresponding to the distribution of R-squared values is less than 0.2. The boxplot 510 shows distribution of accuracy data corresponding to the second set of trained machine-learning models. The boxplot 510 also shows the extent to which the set of clinical metrics (e.g., the age, the BCVA value, the gender) affected the prediction corresponding to the future visual acuity of the subject. For the boxplot graph 510, a median value corresponding to the distribution of R-squared values is slightly above 3.5. The boxplot 515 shows distribution of accuracy data corresponding to the third set of trained machine-learning models. The boxplot 515 also shows the extent to which the segment-specific metrics combined with the set of clinical metrics affected the prediction corresponding to the future visual acuity of the subject. For the boxplot graph 515, a median value corresponding to the distribution of R-squared values is almost 4.0. In addition, a paired t-test was performed based on a random sample drawn from data from the boxplot 510 and data from the boxplot 515. The results of the t-test include a t-statistic value was 4.6 and a mean-difference value of 24.

As indicated by the results shown by the boxplots 505, 510, and 515, the outputs generated from the trained machine-learning models that processed the combined set of segment-specific metrics and clinical metrics are most accurate in predicting the future visual acuity of the subject.

Figure 6:
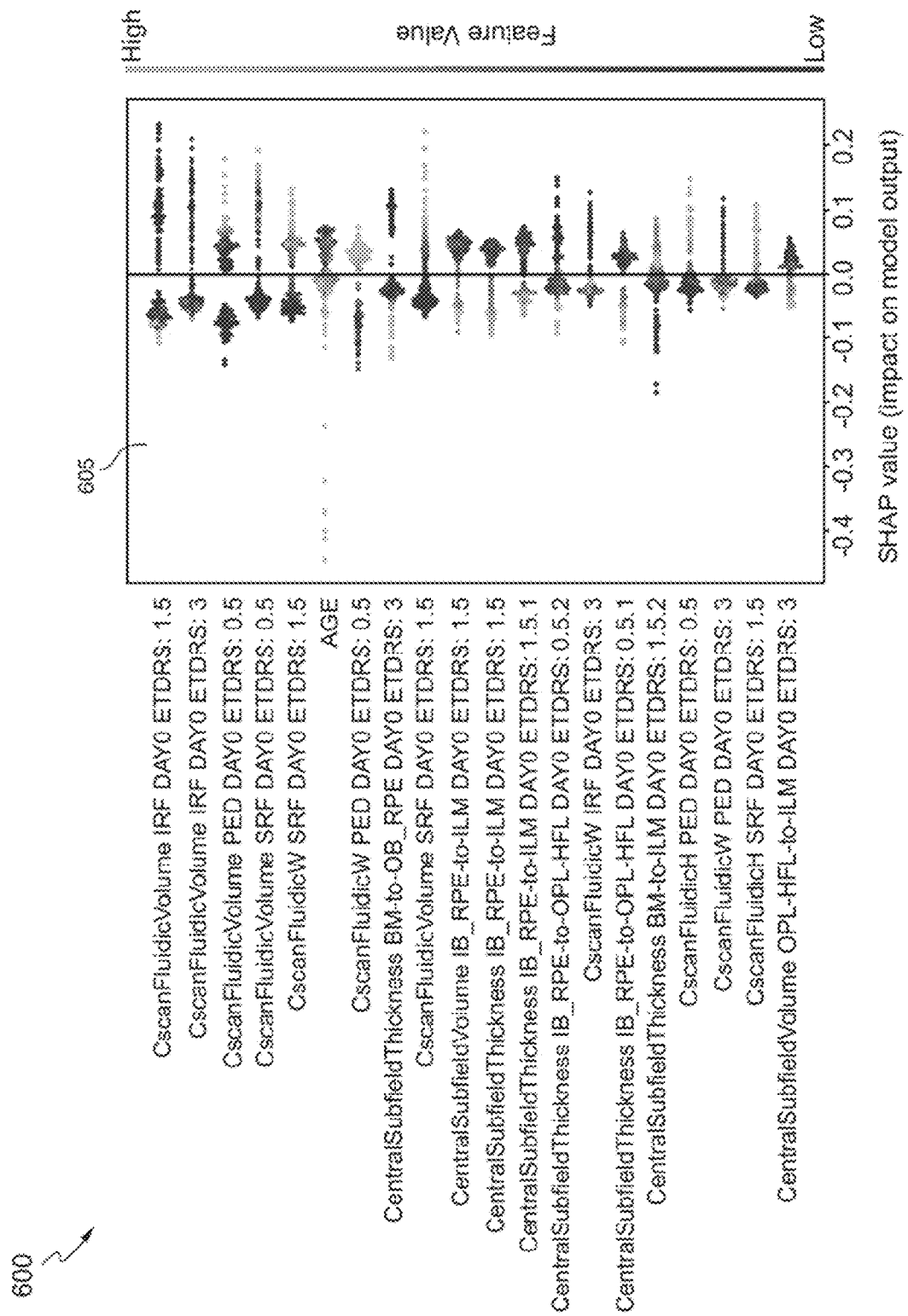
FIG. 6 shows an example graph 600 that identifies an extent to which segment-specific metrics processed by a trained metric-processing machine-learning model can affect a prediction corresponding to a future visual acuity of a subject.

IV.D. Evaluation of Segment-Specific Metrics that Contribute to Future Visual Acuity FIG. 6 shows an example graph 600 that identifies an extent to which segment-specific metrics processed by a trained metric-processing machine-learning model can affect a prediction corresponding to a future visual acuity of a subject. Based on information collected during a training phase for the trained metric-processing machine-learning model, Shapley Additive exPlanations (SHAP) plot 605 depicts graphical information that indicates a correlation between values corresponding to the segment-specific metrics and a probability value corresponding to whether the future acuity value of the subject will exceed a predetermined acuity threshold (e.g., 20/40-BCVA threshold). To generate the information used for plotting the SHAP plot 605, a set of machine-learning models was trained. The set of machine-learning models included image-segmenting machine-models and a metric-processing machine-learning model.

A set of machine-learning models corresponding to SHAP plot 605 was trained using training datasets (e.g., the HARBOR clinical data). Each training image of the set of training images was labeled with a visual acuity of the subject at a time point (e.g., 12 months from initiation of treatment). The set of machine-learning models were trained using a training dataset that includes 907 SD-OCT images (n=907) that correspond to captured image data of subjects at initiation of an anti-VEGF treatment. As the set of machine-learning models are being trained, each segment-specific metric of the set of segment-specific metrics processed by using the metric-processing machine-learning model was associated with an output indicating whether a predicted future visual acuity exceeded a 20/40-BCVA threshold. The associated values were collected and plotted on the SHAP plot 605.

The SHAP plot 605 includes multiple rows and columns. A row of the SHAP plot identifies various attributes corresponding to a particular segment-specific metric: (1) a type of segment-specific metric (e.g., a fluid volume, a thickness between two retinal layers); (2) a type of a retina-related image segment corresponding to the segment-specific metric type; (3) an identifier corresponding to the training dataset; and (4) a particular location in the retina from which the segment-specific matric was identified (e.g., a particular ETDRS value). A placement of a particular row along a y-axis of the SHAP plot 605 indicates an extent to which the segment-specific metric type contributed to the prediction corresponding to the future visual acuity of the subject. For example, a higher placement of a first row in the y-axis of the SHAP plot 605 can indicate that a corresponding segment-specific metric has a higher contribution to the prediction corresponding to the future visual acuity relative to a second row that was placed lower than the first row in the y-axis of the SHAP plot 605.

For each row of the SHAP plot 605, a series of dots corresponding to SHAP values of the corresponding segment-specific metric type were plotted along an x-axis of the SHAP plot 605. The SHAP value indicates the probability value corresponding to whether the future acuity value of the subject will exceed the 20/40-BCVA threshold. A dot can be characterized in different color types to indicate an extent of a particular SHAP value. A blue dot color (for example) can indicate a low segment-specific metric value, whereas a red dot color (for example) can indicate a high segment-specific metric value. In addition, a dot placed at a particular position at the x-axis indicated an extent to which a value of the segment-specific metric contributed to the prediction corresponding to the future visual acuity of the subject. For example, a red dot placed at a high x-axis value can indicate that a higher segment-specific metric value resulted in a higher probability that the future acuity value of the subject will exceed the 20/40-BCVA threshold. In another example, a red dot placed at a low x-axis value can indicate that a higher segment-specific metric value resulted in a much lower probability the future acuity value of the subject will exceed the 20/40-BCVA threshold.

The SHAP plot 605 indicates that certain types of segment-specific metrics and an extent of their corresponding values have a high contribution towards the prediction that the future visual acuity will exceed the 20/40-BCVA threshold. Lower fluid volumes corresponding to intra-retinal fluids indicates a higher probability that the future visual acuity will meet or exceed the 20/40-BCVA threshold. Higher fluid volumes corresponding to sub-retinal fluids or pigment epithelial detachments also indicates a higher probability that the future visual acuity will meet or exceed the 20/40-BCVA threshold. In addition, higher age values generally indicates a lower probability that the future visual acuity will meet or exceed the 20/40-BCVA threshold.

IV.E. Evaluation of Machine-learning Models Based on Types of Input Data

Figure 7A:
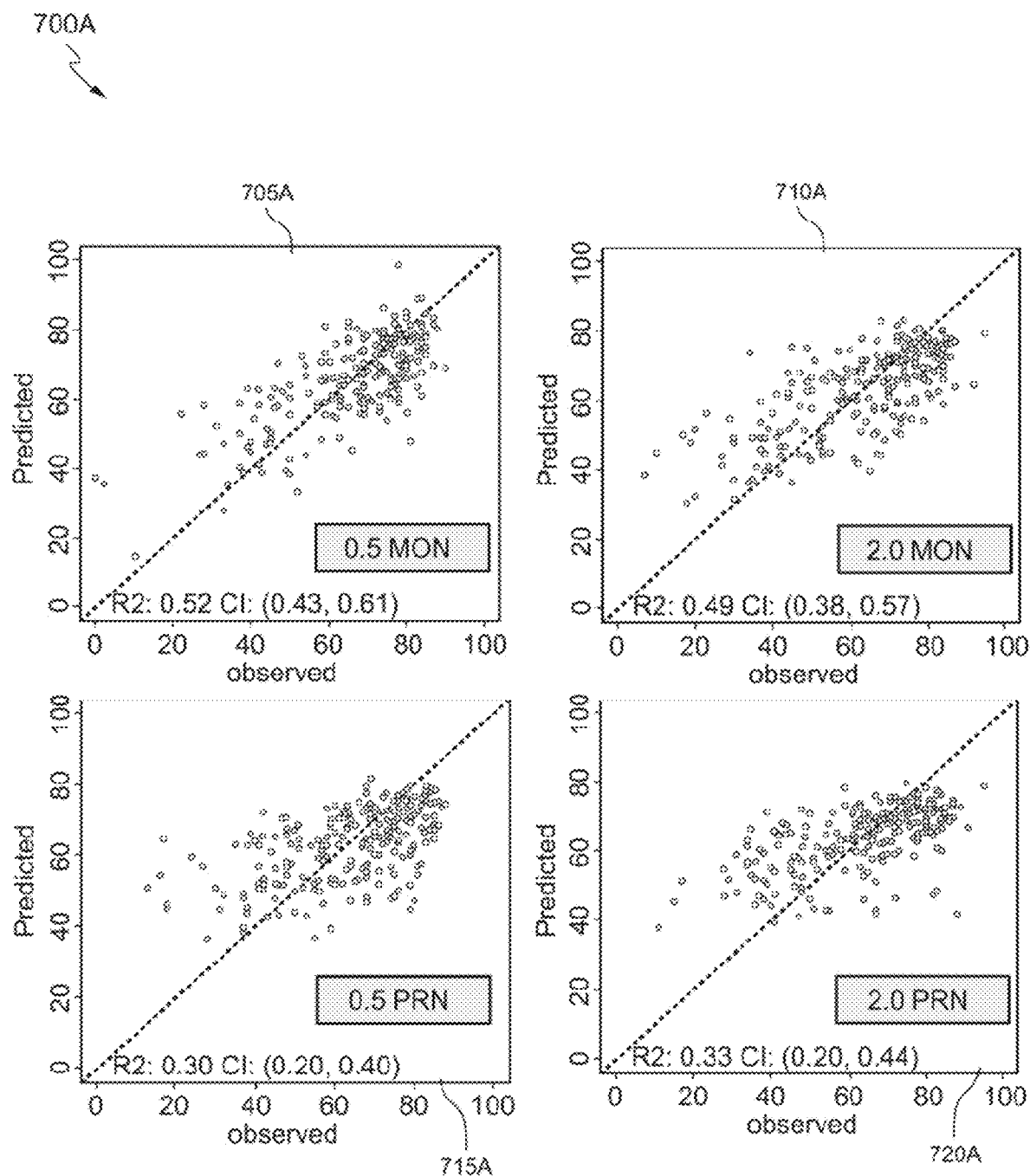
FIGS. 7A-B show example set of graphs that can be used to assess performance of machine-learning models that predict a future visual acuity of a subject.
Figure 7B:
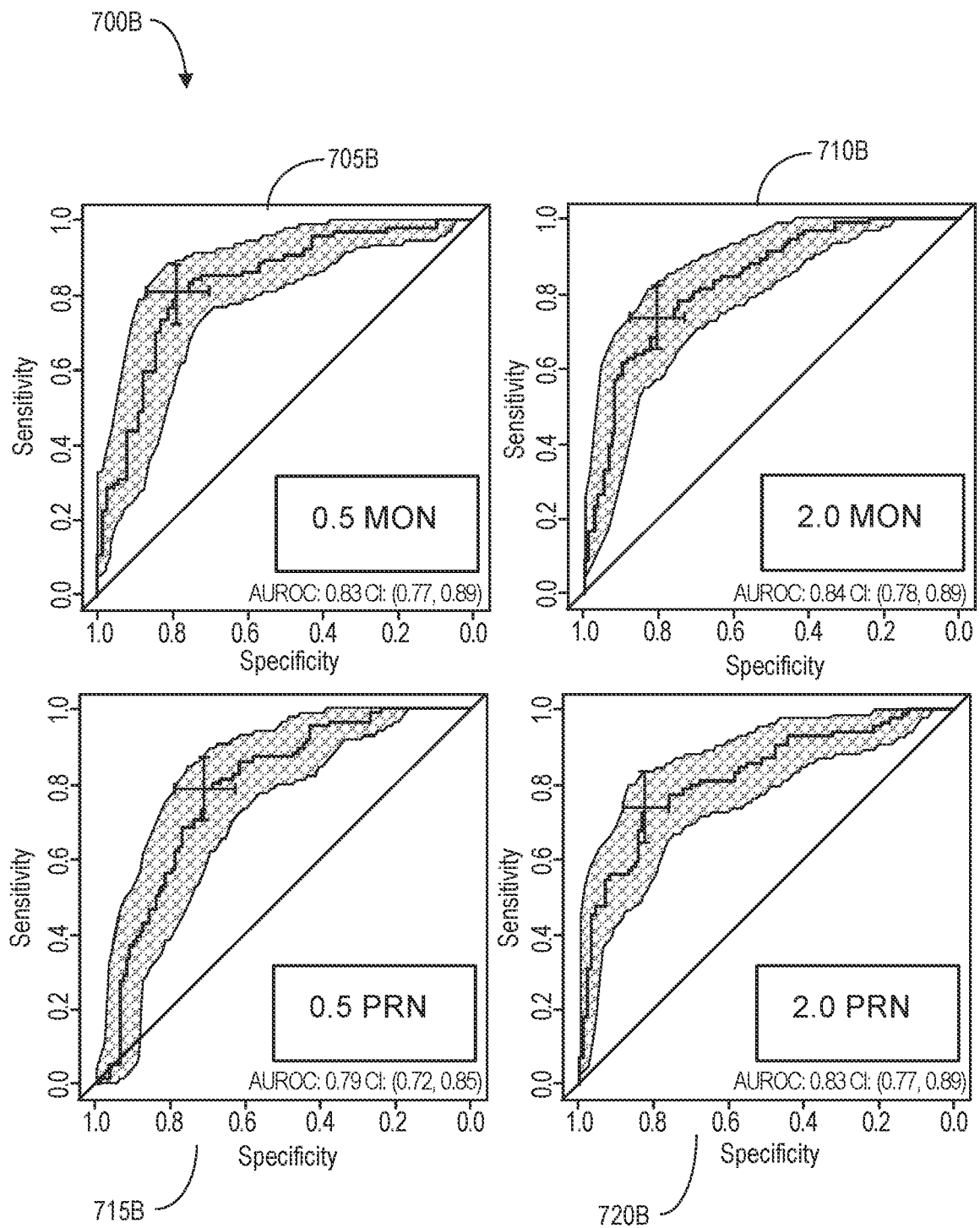

FIGS. 7A-B show example set of graphs that can be used to assess performance of machine-learning models that predict a future visual acuity of a subject. More specifically, FIG. 7A shows a set of scatter-plot graphs 700A and FIG. 7B shows a set of ROC curves 700B, in which both sets convey accuracy data corresponding to outputs generated by trained image-segmenting machine-learning models and trained metric-processing machine-learning models. The sets of graphs 700A and 700B are presented to demonstrate that training data limited to training images corresponding to a subject receiving a particular dosage and frequency of a treatment can increase an overall accuracy of a prediction corresponding a future visual acuity. Each scatter-plot graph of four scatter-plot graphs 705A, 710A, 715A, and 720A and its corresponding ROC curve of ROC curves 705B, 710B, 715B, and 720B corresponds to a set of trained machine-learning models. The set of machine-learning model included trained image-segmenting machine-models (e.g., the image-segmenting machine-learning models 104a-n) and a trained metric-processing machine-learning model (e.g., the metric-processing machine-learning model 110 of FIG. 1).

Each set of the four sets of machine-learning models was trained using training datasets (e.g., the HARBOR clinical data). The training datasets included a set of training images. Each training image of the set of training images was labeled with a visual acuity of the subject at a time point (e.g., 12 months from initiation of treatment). Different subsets of the training datasets were used to train each set of the four sets of machine-learning models:
1. A first set of machine-learning models that correspond to the scatter-plot graph 705A and the ROC curve 705B were trained using a first training dataset that includes training images that correspond to captured image data of subjects that initiated an anti-VEGF treatment at Ranibizumab 0.5 mg per month;
2. A second set of machine-learning models that correspond to the scatter-plot graph 710A and the ROC curve 710B were trained using a second training dataset that includes training images that correspond to captured image data of subjects that initiated an anti-VEGF treatment at Ranibizumab 2.0 mg per month;
3. A third set of machine-learning models that correspond to the scatter-plot graph 715A and the ROC curve 715B were trained using a third training dataset that includes training images that correspond to captured image data of subjects that initiated an anti-VEGF treatment at Ranibizumab 0.5 mg on as-needed basis; and
4. A fourth set of machine-learning models that correspond to the scatter-plot graph 720A and the ROC curve 720B were trained using a fourth training dataset that includes training images that correspond to captured image data of subjects that initiated an anti-VEGF treatment at Ranibizumab 2.0 mg on as-needed basis.

Following the training phase, the four sets of trained machine-learning models were used to process unlabeled images (e.g., the image 102 of FIG. 1) and generate an output that corresponds to a prediction corresponding to a future visual acuity associated with 12 months from a date on which the unlabeled images were collected. With respect to the set of scatter-plot graphs 700A of FIG. 7A, each output generated from each set of the four sets of trained machine-learning models was associated with an observed data derived from an unlabeled image used to generate the output. The associated values were plotted into a scatter-plot graph (e.g., the scatter-plot graph 705A) and were used to generate R-square value that corresponds to the scatter-plot graph. With respect to the set of ROC curves 700B of FIG. 7B, each output generated from each set of the four sets of trained machine-learning models was used to identify whether the future visual acuity exceeded a 20/40-BCVA threshold. These outputs were also compared to actual observations that were derived from the same unlabeled images.

The first set of trained machine-learning models corresponding to the scatter-plot graph 705A indicates an R-squared value of 0.52. With respect to the ROC curve 705B, the first set of trained machine-learning models indicates an AOC value of $0.83\pm0.06$, a sensitivity value of $0.88\pm0.06$, and a specificity value of $0.68\pm0.10$. The second set of trained machine-learning models corresponding to the scatter-plot graph 710A indicates an R-squared value of 0.49. With respect to the ROC curve 710B, the first set of trained machine-learning models indicates an AOC value of $0.84\pm0.06$, a sensitivity value of $0.74\pm0.09$, and a specificity value of $0.81\pm0.08$.

The third set of trained machine-learning models corresponding to the scatter-plot graph 715A indicates an R-squared value of 0.30. With respect to the ROC curve 715B, the first set of trained machine-learning models indicates an AOC value of $0.72\pm0.07$, a sensitivity value of $0.67\pm0.09$, and a specificity value of $0.72\pm0.08$. The fourth set of trained machine-learning models corresponding to the scatter-plot graph 720A indicates an R-squared value of 0.35. With respect to the ROC curve 720B, the first set of trained machine-learning models indicates an AOC value of $0.79\pm0.06$, a sensitivity value of $0.69\pm0.09$, and a specificity value of $0.79\pm0.07$.

To compare the above results, a control set of trained machine-learning models were trained on a training dataset that were associated with subjects that received anti-VEGF treatments under various dose levels and treatment frequencies. The results corresponding to the control set include an R-squared value of 0.40, an AOC value of $0.77\pm0.04$, a sensitivity value of $0.74\pm0.05$, and a specificity value of $0.70\pm0.05$. Based on the comparison of the results, the sets of machine-learning models trained with training datasets pertaining to subjects that received periodic anti-VEGF treatments performed noticeably better than the trained machine-learning models trained with subjects that received various dosages and frequencies of anti-VEGF treatments. With respect to the sets of machine-learning models trained with training datasets pertaining to subjects that received anti-VEGF treatments on as-needed basis, the results are about the same or slightly better than the result from the control set. These observations may indicate that the machine-learning models can be trained with different types of training datasets depending on the dosage frequencies that are being administered to the subject.

V. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

In addition, embodiments of the disclosure can be described in view of the following clauses:

1. A computer-implemented method comprising:
processing, using one or more first models, an image of at least part of a retina of a subject to detect a set of retina-related segments, each of the set of retina-related segments including a retinal structure or a type of retinal fluid;
generating a set of segment-specific metrics, each of the set of segment-specific metrics characterizing a retina-related segment of the set of retina-related segments;
processing the set of segment-specific metrics using a second model to generate a result corresponding to a prediction corresponding to a future visual acuity of the subject; and
outputting the result.

2. The computer-implemented method of clause 1, wherein a first model of the one or more first models includes a deep-convolutional neural network.

3. The computer-implemented method of clause 1 or 2, wherein a first model of the one or more first models uses an intra-retinal-layer segmentation algorithm.

4. The computer-implemented method of any of clauses 1 to 3, wherein:
a first model of the one or more first models is used to detect a segment corresponding to the type of retinal fluid; and
another model of the one or more first models is used to detect a segment corresponding to the retinal structure.

5. The computer-implemented method of any of clauses 1 to 4, wherein the second model includes a trained gradient-boosting machine.

6. The computer-implemented method of any of clauses 1 to 5, wherein the image is an optical-coherence-tomography (OCT) image.

7. The computer-implemented method of any of clauses 1 to 6, wherein a retina-related segment of the set of retina-related segments includes a particular retinal structure that indicates one or more retinal layers of the retina (e.g., a nerve-fiber layer, a ganglion-cell layer).

8. The computer-implemented method of any of clauses 1 to 7, wherein the particular retinal structure indicates one or more parts of the retina located beneath a retinal pigment epithelium, the one or more parts of the retina including a Bruch's membrane, a choroid, and a sclera.

9. The computer-implemented method of any of clauses 1 to 8, wherein a retina-related segment of the set of retina-related segments indicates a pigment epithelial detachment of the retinal structure.

10. The computer-implemented method of any of clauses 1 to 9, wherein a retina-related segment of the set of retina-related segments includes a particular type of retinal fluid that includes a sub-retinal fluid (SRF) or intra-retinal fluid (IRF).

11. The computer-implemented method of any of clauses 1 to 10, wherein a retina-related segment of the set of retina-related segments indicates one or more deformities present in the retina, the one or more deformities including a macular hole, a macular plucker, and a deteriorated macula.

12. The computer-implemented method of any of clauses 1 to 11, wherein the result indicates a prediction that the future visual acuity of the subject at a particular future time point will exceed a predetermined acuity threshold.

13. The computer-implemented method of any of clauses 1 to 12, wherein a segment-specific metric of the set of segment-specific metrics indicates a fluid volume corresponding to the intra-retinal fluid, wherein a lower value corresponding to the fluid volume increases a likelihood that the future visual acuity of the subject at a particular future time point will exceed a predetermined acuity threshold.

14. The computer-implemented method of any of clauses 1 to 13, wherein a segment-specific metric of the set of segment-specific metrics indicates a fluid volume corresponding to the sub-retinal fluid, wherein a higher value corresponding to the fluid volume increases a likelihood that the future visual acuity of the subject at a particular future time point will exceed a predetermined acuity threshold.

15. A computer-implemented method comprising:
processing, using one or more image-segmenting models, an image of at least part of a retina of a subject to detect a set of retina-related segments in the image, each of the set of retina-related segments including a retinal structure or a type of retinal fluid;
generating a set of segment-specific metrics, each of the set of segment-specific metrics characterizing a retina-related segment of the set of retina-related segments, wherein a segment-specific metric identifies an amount of fluid volume corresponding to the type of retinal fluid or a thickness corresponding to the retinal structure;
processing the set of segment-specific metrics using a metric-processing model, wherein the amount of the fluid volume corresponding to the type of retinal fluid is a primary indicator for determining a degree of a future enhancement of a visual acuity of the subject relative to the thickness corresponding to the retinal structure;
in response to the determining, generating a result corresponding to a prediction corresponding to a future visual acuity of the subject; and
outputting the result.

16. A computer-implemented method comprising:
processing, using one or more image-segmenting models, an image of at least part of a retina of a subject to detect a set of retina-related segments in the image, each of the set of retina-related segments including a retinal structure or a type of retinal fluid;

generating a set of segment-specific metrics, each of the set of segment-specific metrics characterizing a retina-related segment of the set of retina-related segments, wherein a segment-specific metric identifies an amount of fluid volume corresponding to the type of retinal fluid;

processing the set of segment-specific metrics using a metric-processing model, wherein the amount of the fluid volume corresponding to the type of retinal fluid is a primary indicator for determining a future visual acuity of the subject relative to a thickness corresponding to the retinal structure;

in response to the determining, generating a result corresponding to a prediction corresponding to the future visual acuity of the subject; and outputting the result.

17. A system comprising:
one or more data processors; and
a non-transitory computer readable storage medium containing instructions which, when executed on the one or more data processors, cause the one or more data processors to perform any of clauses 1 to 16.

18. A computer-program product tangibly embodied in a non-transitory machine-readable storage medium, including instructions configured to cause one or more data processors to perform any of clauses 1 to 16.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
processing, using one or more image-segmenting models, an image of at least part of a retina of a subject to detect a set of retina-related segments in the image, each of the set of retina-related segments including a retinal structure or a type of retinal fluid;

generating a set of segment-specific metrics, each of the set of segment-specific metrics characterizing a retina-related segment of the set of retina-related segments, wherein at least one segment-specific metric of the set of segment-specific metrics identifies an amount of fluid volume corresponding to the type of retinal fluid, and wherein the type of retinal fluid is (i) an intra-retinal fluid, and a decrease of a value corresponding to the at least one segment-specific metric indicates an increase of a likelihood that a future visual acuity of the subject at a particular future time point will exceed a predetermined acuity threshold, or (ii) a sub-retinal fluid, and an increase of a value corresponding to the at least one segment-specific metric indicates an increases a likelihood that the future visual acuity of the subject at a particular future time point will exceed a predetermined acuity threshold;

processing the set of segment-specific metrics using a metric-processing model to determine that the amount of the fluid volume corresponding to the type of retinal fluid is a primary indicator for determining a degree of a future enhancement of a visual acuity of the subject;

generating a result corresponding to a prediction corresponding to the future visual acuity of the subject; and outputting the result.

2. The computer-implemented method of claim 1, wherein an image-segmenting model of the one or more image-segmenting models includes a deep-convolutional neural network.

3. The computer-implemented method of claim 1, wherein an image-segmenting model of the one or more image-segmenting models uses an intra-retinal-layer segmentation algorithm.

4. The computer-implemented method of claim 1, wherein:
an image-segmenting model of the one or more image-segmenting models is used to detect a segment corresponding to the type of retinal fluid; and
another model of the one or more image-segmenting models is used to detect a segment corresponding to the retinal structure.

5. The computer-implemented method of claim 1, wherein the metric-processing model includes a trained gradient-boosting machine.

6. The computer-implemented method of claim 1, wherein the image is an optical-coherence-tomography (OCT) image.

7. The computer-implemented method of claim 1, wherein a retina-related segment of the set of retina-related segments includes a particular retinal structure that indicates one or more retinal layers of the retina.

8. The computer-implemented method of claim 7, wherein the particular retinal structure indicates one or more parts of the retina located beneath a retinal pigment epithelium, the one or more parts of the retina including a Bruch's membrane, a choroid, and a sclera.

9. The computer-implemented method of claim 1, wherein a retina-related segment of the set of retina-related segments indicates a pigment epithelial detachment of the retinal structure.

10. The computer-implemented method of claim 1, wherein a retina-related segment of the set of retina-related segments includes a particular type of retinal fluid that includes a sub-retinal fluid (SRF) or intra-retinal fluid (IRF).

11. The computer-implemented method of claim 1, wherein a retina-related segment of the set of retina-related segments indicates one or more deformities present in the retina, the one or more deformities including a macular hole, a macular pucker, and a deteriorated macula.

12. The computer-implemented method of claim 1, wherein the result indicates a prediction that the future visual acuity of the subject at a particular future time point will exceed a predetermined acuity threshold.

13. A system comprising:
one or more data processors; and
a non-transitory computer readable storage medium containing instructions which, when executed on the one or more data processors, cause the one or more data processors to perform one or more operations comprising:
processing, using one or more image-segmenting models, an image of at least part of a retina of a subject to detect a set of retina-related segments in the image, each of the set of retina-related segments including a retinal structure or a type of retinal fluid;
generating a set of segment-specific metrics, each of the set of segment-specific metrics characterizing a retina-related segment of the set of retina-related segments, wherein at least one segment-specific metric of the set of segment-specific metrics identifies an amount of fluid volume corresponding to the type of retinal fluid, and wherein the type of retinal fluid is (i) an intra-retinal fluid, and a decrease of a value corresponding to the at least one segment-specific metric indicates an increase of a likelihood that a future visual acuity of the subject at a particular future time point will exceed a predetermined acuity threshold, or (ii) a sub-retinal fluid, and an increase of a value corresponding to the at least one segment-specific metric indicates an increases a likelihood that the future visual acuity of the subject at a particular future time point will exceed a predetermined acuity threshold;
processing the set of segment-specific metrics using a metric-processing model to determine that the amount of the fluid volume corresponding to the type of retinal fluid is a primary indicator for determining a degree of a future enhancement of a visual acuity of the subject;
generating a result corresponding to a prediction corresponding to the future visual acuity of the subject; and
outputting the result.

14. The system of claim 13, wherein an image-segmenting model of the one or more image-segmenting models includes a deep-convolutional neural network.

15. The system of claim 13, wherein an image-segmenting model of the one or more image-segmenting models uses an intra-retinal-layer segmentation algorithm.

16. The system of claim 13, wherein:
an image-segmenting model of the one or more image-segmenting models is used to detect a segment corresponding to the type of retinal fluid; and
another model of the one or more image-segmenting models is used to detect a segment corresponding to the retinal structure.

17. The system of claim 13, wherein a retina-related segment of the set of retina-related segments includes a particular retinal structure that indicates one or more retinal layers of the retina.

18. A computer-program product tangibly embodied in a non-transitory machine-readable storage medium, including instructions configured to cause one or more data processors to perform one or more operations comprising:
processing, using one or more image-segmenting models, an image of at least part of a retina of a subject to detect a set of retina-related segments in the image, each of the set of retina-related segments including a retinal structure or a type of retinal fluid;
generating a set of segment-specific metrics, each of the set of segment-specific metrics characterizing a retina-related segment of the set of retina-related segments, wherein at least one segment-specific metric of the set of segment-specific metrics identifies an amount of fluid volume corresponding to the type of retinal fluid, and wherein the type of retinal fluid is (i) an intra-retinal fluid, and a decrease of a value corresponding to the at least one segment-specific metric indicates an increase of a likelihood that a future visual acuity of the subject at a particular future time point will exceed a predetermined acuity threshold, or (ii) a sub-retinal fluid, and an increase of a value corresponding to the at least one segment-specific metric indicates an increases a likelihood that the future visual acuity of the subject at a particular future time point will exceed a predetermined acuity threshold;
processing the set of segment-specific metrics using a metric-processing model to determine that the amount of the fluid volume corresponding to the type of retinal fluid is a primary indicator for determining a degree of a future enhancement of a visual acuity of the subject;
generating a result corresponding to a prediction corresponding to the future visual acuity of the subject; and
outputting the result.

* * * * *